US 11,303,912 B2

(12) United States Patent
Ramasubramonian et al.

(10) Patent No.: US 11,303,912 B2
(45) Date of Patent: Apr. 12, 2022

(54) DECODED PICTURE BUFFER MANAGEMENT AND DYNAMIC RANGE ADJUSTMENT

(71) Applicant: QUALCOMM Incorporated, San Diego, CA (US)

(72) Inventors: Adarsh Krishnan Ramasubramonian, Irvine, CA (US); Dmytro Rusanovskyy, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/385,469

(22) Filed: Apr. 16, 2019

(65) Prior Publication Data
US 2019/0327477 A1  Oct. 24, 2019

Related U.S. Application Data

(60) Provisional application No. 62/659,617, filed on Apr. 18, 2018.

(51) Int. Cl.
H04N 19/14 (2014.01)
H04N 19/44 (2014.01)
(Continued)

(52) U.S. Cl.
CPC .......... H04N 19/196 (2014.11); G06T 5/008 (2013.01); G06T 5/50 (2013.01); H04N 19/105 (2014.11);
(Continued)

(58) Field of Classification Search
None
See application file for complete search history.

(56) References Cited

U.S. PATENT DOCUMENTS 7,068,396 B1 * 6/2006 Gallagher ......... H01L 27/14625
358/3.01
8,761,539 B2 * 6/2014 Kerofsky ............... G06T 5/008
382/274
(Continued)

FOREIGN PATENT DOCUMENTS

CN 104956675 A 9/2015
CN 106416250 A 2/2017

OTHER PUBLICATIONS

Search Report IP.com.*
(Continued)

Primary Examiner — Mohammad J Rahman
(74) Attorney, Agent, or Firm — Shumaker & Sieffert, P.A.

(57) ABSTRACT

The disclosure describes example of performing an inverse dynamic range adjustment (DRA) to a picture as part of outputting the picture from memory. A device for decoding video data includes a memory configured to store a picture in a DRA domain and a processor configured to determine that the picture in the dynamic range adjustment (DRA) domain stored in the memory is to be output from the memory, subsequent to determining that the picture in the DRA domain is to be output, perform a process of outputting the picture in the DRA domain, and at the process of outputting the picture in the DRA domain from the memory, apply inverse DRA to the picture.

22 Claims, 12 Drawing Sheets

(51) Int. Cl.
| | |
|---|---|
| *H04N 19/105* | (2014.01) |
| *H04N 19/176* | (2014.01) |
| *H04N 19/186* | (2014.01) |
| *H04N 19/196* | (2014.01) |
| *G06T 5/00* | (2006.01) |
| *G06T 5/50* | (2006.01) |

(52) U.S. Cl.
CPC ........... *H04N 19/14* (2014.11); *H04N 19/176* (2014.11); *H04N 19/186* (2014.11); *H04N 19/44* (2014.11); *G06T 2207/20208* (2013.01)

(56) References Cited

U.S. PATENT DOCUMENTS

| | | | | |
|---|---|---|---|---|
| 9,641,862 | B2* | 5/2017 | Hannuksela | H04N 19/127 |
| 2003/0112876 | A1* | 6/2003 | Kerofsky | H04N 19/126 |
| | | | | 375/240.25 |
| 2011/0188744 | A1* | 8/2011 | Sun | H04N 5/2355 |
| | | | | 382/162 |
| 2015/0156501 | A1* | 6/2015 | Hannuksela | H04N 19/70 |
| | | | | 375/240.12 |
| 2015/0195523 | A1* | 7/2015 | Sato | H04N 19/186 |
| | | | | 375/240.12 |
| 2017/0070701 | A1* | 3/2017 | Nakajima | H04N 7/081 |
| 2017/0085879 | A1 | 3/2017 | Minoo et al. | |
| 2017/0085894 | A1* | 3/2017 | Ramasubramanian | |
| | | | | H04N 19/46 |
| 2017/0085896 | A1* | 3/2017 | Ramasubramanian | |
| | | | | H04N 19/70 |
| 2017/0105014 | A1* | 4/2017 | Lee | H04N 19/30 |
| 2017/0186162 | A1* | 6/2017 | Mihic | G06T 5/50 |
| 2018/0198970 | A1* | 7/2018 | Seshadrinathan | G06T 5/50 |
| 2018/0242006 | A1* | 8/2018 | Kerofsky | H04N 19/186 |
| 2018/0260942 | A1* | 9/2018 | Jolly | G06T 5/007 |
| 2018/0270489 | A1* | 9/2018 | Maymon | G06T 5/009 |

OTHER PUBLICATIONS

Bordes, et al., "Description of SDR, HDR and 360 Video Coding Technology Proposal by Qualcomm and Technicolor-Medium Complexity Version," JVET-J0022r1, 10th Meeting; San Diego, US, Apr. 10-20, 2018, (The Joint Video Exploration Team of ISO/IEC JTC1/SC29/WG11 and ITU-T SG.16); 84 pp.
Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v2, 14th Meeting: Geneva, CH, Mar. 19-27, 2019, 364 pages.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Chujoh (Toshiba) T et al., "Video coding technology proposal by Toshiba", 1. JCT-VC Meeting; Apr. 15, 2010-Apr. 23, 2010; Dresden; (Joint Collaborative Team on Video Coding of ISO/IEC JTC1/SC29/WG11 and ITU-TSG.16); No. JCTVC-A117, XP030007558, 38 Pages, Apr. 18, 2010 (Apr. 18, 2010), XP030007559, ISSN: 0000-0049, URL: http://wftp3.itu.int/av-arch/jctvc-site/, Abstract; figures 2, 10, Sections 1, 2.7, 3.1.

Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/027869—ISA/EPO—dated Jul. 4, 2019 (15 pp).
ITU-R Recommendation BT.2020-2, "Parameter values for UHDTV systems for production and international programme exchange," Oct. 2015, 8 pages.
ITU-R Recommendation BT.2100-2, "Image parameter values for high dynamic range television for use in production and international programme exchange," Jul. 2018, 16 pages.
ITU-R Recommendation BT.709-6, "Parameter values for the HDTV standards for production and international programme exchange," Jun. 2015, pp. 1-17.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Kerofsky L., et al., "Color Gamut Scalable Video Coding," Joint Collaborative Team on Video Coding (JCT-VC) of ITU-T SG16 and ISO/IEC JTC1/SC29/WG11, 11th Meeting: 102. MPEG meeting, Shanghai, CN, Oct. 10-19, 2012, Document: JCTVC-K0241, XP030113123, pp. 1-11, DOI: 10.1109/DCC.2013.29, abstract; figure 9, Section 3.1.
QUALCOMM Inc., "Dynamic Range Adjustment SEI to Enable High Dynamic Range Video Coding with Backward-Compatible Capability," International Telecommunication Union, Study Group 16, No. COM 16-C 1027-E, ITU-T, Sep. 2015, XP030100746, pp. 1-11.
Ramasubramanian A K., "HDR CE2.a-1: Report on LCS", Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, No. JCTVC-W0101r1, 7 pages.
Ramasubramanian A.K., et al., "Additional Information on HDR Video Coding Technology Proposal by Qualconm and Technicolor", 10.JVET Meeting, Apr. 10, 2018-Apr. 20, 2018; San Diego; (The Joint Video Exploration Team of ISO/IEC JTC1/SC29/WG11 and ITU-TSG 16), URL: http://phenix.int-evry.fr/jvet/ No. JVET-J0067, Apr. 3, 2018 (Apr. 3, 2018), pp. 1-7, XP030151258, Abstract, Sections 1-2, pp. 1-2.
SMPTE Standard for Motion-Picture Film {8-mm TypeR}—Camera Aperture Image and Usage, SMPTE 231-2004, Nov. 8, 2004, 4 pp.
SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, 14 pp., ISBN: 978-1-61482-829-7.
Wang Y.K., et al., "AHG9: On conformance-cropping-window-restricted inter-layer prediction", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0274, Apr. 9, 2013 (Apr. 9, 2013), 3 Pages, XP030114231, the whole document, abstract, Section 3.

* cited by examiner

Example of EOTFs

DECODED PICTURE BUFFER MANAGEMENT AND DYNAMIC RANGE ADJUSTMENT

This application claims the benefit of U.S. Provisional Application No. 62/659,617, filed Apr. 18, 2018, the entire contents of which are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure is related to the field of coding of video signals with High Dynamic Range (HDR) and Wide Color Gamut (WCG) representations. More specifically, the current disclosure describes signaling and operations applied to video data in certain color spaces to enable more efficient compression of HDR and WCG video data. The techniques described herein may improve the compression efficiency of hybrid transform-based video coding systems (e.g., video coders that utilize block based video coding including inter and intra-prediction) utilized for coding HDR & WCG video data.

A video coder (e.g., video encoder or video decoder) is configured to perform a "bumping process" to output (e.g., for display or further processing) a picture currently stored in the decoded picture buffer (DPB). In some examples, the video coder is configure to output a picture based on a timing parameter. The pictures stored in the DPB may be stored in the mapped-domain (e.g., after dynamic range adjustment (DRA)). The mapped-domain is also referred to as the DRA domain. In one or more examples described in this disclosure, the video coder may apply inverse DRA to the picture being removed (e.g., as part of the bumping process or based on the timing parameter). In this manner, rather than performing the inverse DRA operations external to the video coder, the inverse DRA operations can be integrated into the operation of the video coder, thereby promoting more efficient inverse DRA process. Furthermore, by applying the inverse DRA, the video coder may not need to store pictures in the both the DRA domain and the original domain or perform on-the-fly conversion from the original domain to the DRA domain for inter-prediction.

In one example, the disclosure describes a method of decoding video data. The method comprising determining that a picture in a dynamic range adjustment (DRA) domain stored in a memory is to be output from the memory, subsequent to determining that the picture in the DRA domain is to be output, performing a process of outputting the picture in the DRA domain, and at the process of outputting the picture in the DRA domain, applying inverse DRA to the picture.

In one example, the disclosure describes a device for decoding video data. The device comprising a memory configured to store a picture in a dynamic range adjustment (DRA) domain and a processor configured to determine that the picture in the dynamic range adjustment (DRA) domain stored in the memory is to be output from the memory, subsequent to determining that the picture in the DRA domain is to be output, perform a process of outputting the picture in the DRA domain, and at the process of outputting the picture in the DRA domain from the memory, apply inverse DRA to the picture.

In one example, the disclosure describes a computer-readable storage medium storing instruction thereon that when executed cause one or more processors of a device for decoding video data to determine that a picture in a dynamic range adjustment (DRA) domain stored in a memory is to be output from the memory, subsequent to determining that the picture in the DRA domain is to be output, perform a process of outputting the picture in the DRA domain, and at the process of outputting the picture in the DRA domain, apply inverse DRA to the picture.

In one example, the disclosure describes a device for decoding video data. The device comprises means for determining that a picture in a dynamic range adjustment (DRA) domain stored in a memory is to be output from the memory, means for performing a process of outputting the picture in the DRA domain, subsequent to determining that the picture in the DRA domain is to be output, and means for applying inverse DRA to the picture, at the process of outputting the picture in the DRA domain.

The details of one or more examples are set forth in the accompanying drawings and the description below. Other features, objects, and advantages will be apparent from the description, drawings, and claims.

DETAILED DESCRIPTION

Figure 1:
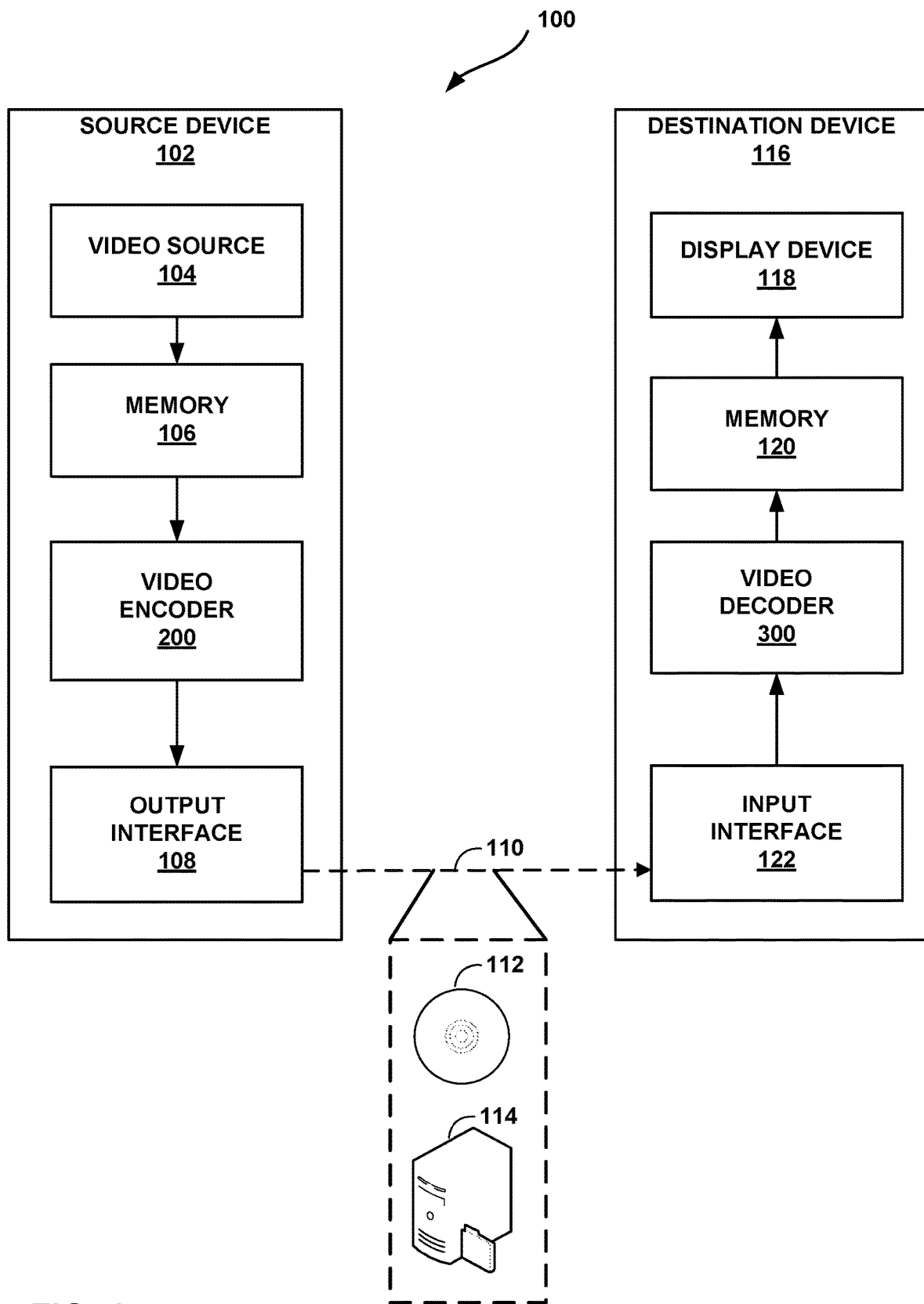
FIG. 1 is a block diagram illustrating an example video encoding and decoding system that may perform the techniques of this disclosure.

In video encoding, a video encoder encodes video data for signaling, and a video decoder performs a reciprocal process to decode the video data. Dynamic range adjustment (DRA) may be applied to video samples in a block/picture thus producing samples in the "mapped-domain" which is a more efficient representation for compression (e.g., video encoding). Video coding (e.g., encoding or decoding) can be conducted in the mapped-domain (e.g., DRA domain), thus pictures in the mapped-domain are held in a decoded picture buffer (DPB) for reference during inter-prediction. Inter-prediction is a process where blocks in a reference picture are used to encode a block in a current picture, and the DPB stores the reference pictures. In some examples, the reference pictures are stored in the mapped-domain.

The inverse DRA can be applied to some pictures in the DPB prior to being output to convert the samples to the original domain. For instance, a video decoder may reconstruct the video data in the mapped-domain (e.g., DRA domain), and the video decoder, or some other component, may perform the inverse DRA process to convert the pictures in the mapped-domain (e.g., DRA domain) back to the original domain for output for display or further processing.

Dynamic range adjustment is a mapping operation that is performed to the video samples. Dynamic range adjustment may be applied to video samples in several applications. Video samples that are to be coded are considered to the original domain. In some examples, dynamic range adjustment is applied to video to improve the compression efficiency by mapping the data from the original domain to the mapped domain. This mapping may be referred to as a forward mapping and the encoding may be done in the mapped domain. The inverse process may be applied on the decoder side to convert the samples to the original domain.

In some examples, DRA may be used to convert the video to a domain that is more suitable for displaying. For example, in some examples, video may be captured and represented in a format that is suitable for displays with one set of capabilities (e.g., content suitable to display in HDR (High dynamic range) displays that use the PQ (perceptual quantization) transfer function). A display that is used at the decoder side may not have such a capability (e.g., a display that can only display SDR content with the gamma transfer function). In such cases, DRA may be used to map the video to a domain that is more suitable for the first display. The forward mapping may be optional in such cases, and an inverse mapping may be performed at the decoder side.

Techniques disclosed in this application may be applicable to one or more application scenarios that use some form of mapping on the decoder-side. Referring to an operation as inverse mapping need not necessarily imply that a forward mapping was applied to the original video. For a particular display, the original content captured may itself be the mapped domain and the domain after inverse DRA mapping may be considered as the "original domain" described in this disclosure.

As described in more detail below, there may be technical problems associated with handling DRA-related operations at the decoder side, such as increased DPB size or increased computational complexity or processing power. This disclosure describes several techniques to improve dynamic range adjustment and its integration with hybrid transform-based video codecs, including signaling. As one example, at the decoder side, the video decoder, or some other component, may apply inverse DRA to the pictures at the bumping process or when the picture is to be output based on a timing parameter, sequentially to the application of the conformance cropping window. A cropping window defines a height and width, and image content within the cropping window is kept and the rest is discarded (or vice-versa based on operation of cropping window). In this way, the example techniques may provide for practical applications for technical solutions to technical problems of performing DRA related operations at the decoder side.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may include any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for dynamic range adjustment. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for dynamic range adjustment. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray™ discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 13th Meeting: Geneva, 19-27 Mar. 2019, JVET-N1001-v2 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may be configured to perform operations for dynamic range adjustment (DRA). DRA may be a process applied to video samples to convert the video sample to a different domain (called the mapped-domain or DRA domain) that is more suited for compression. Simply for ease of description, the example techniques are described with respect to video encoder 200 and video decoder 300. However, in some examples, a video preprocessor may perform the DRA operations, and output the result to video encoder 200 for encoding. In some examples, a video postprocessor may receive decoded video data from video decoder 300 and perform the inverse DRA operations. The inverse DRA operations bring back the video data in the mapped-domain to the original domain, which can be the domain for the video data to be displayed (e.g., for HRD or WCG video). The example techniques may be performed by processing circuitry, examples of which include video preprocessor, video encoder 200, or a combination of the two on the encoder side, video postprocessor, video decoder 300, or a combination of the two on the decoder side.

However, the example techniques described in this disclosure are described such that video encoder 200 and/or video decoder 300, and more particularly, video decoder 300 are configured to perform the example inverse DRA operations. By having video encoder 200 and/or video decoder 300 perform the example inverse DRA operations, this disclosure describes examples of hybrid transform-based video codecs. For example, video encoder 200 and video decoder 300, in addition to encoding and decoding in the "mapped-domain," (also called DRA domain) video encoder 200 and video decoder 300 are further configured to perform the inverse DRA operations to convert the DRA domain video data into the original domain so that a video postprocessor does not need to perform such operations.

There may be technical benefits of having video decoder 300 perform the inverse DRA operations. For example, by performing the inverse DRA operations within video decoder 300, video decoder 300 may not need to output scale and offset parameters for performing the inverse DRA operations to a video postprocessor, which can promote efficient inverse DRA operations. For example, performing the inverse DRA operations outside of video decoder 300 may require time being wasted in storing parameters and later retrieving the parameters in postprocessing, rather than performing the inverse DRA operations in the decoding process.

For example, video decoder 300 may receive encoded video data for a picture and metadata that includes the DRA parameters for the picture. In examples where a video postprocessors performs the inverse DRA operations, video decoder 300 may then need to ensure that the metadata is synchronized with the picture because video decoder 300 may need to output the decoded picture in the DRA domain and output the metadata for that picture so that the video postprocessor can perform the inverse DRA. If the synchronization between the picture and the metadata is lost, then the video postprocessor may not be able to correctly perform the inverse DRA.

Moreover, in some examples, the video postprocessor need not necessarily be coupled directly to video decoder 300 but may be a component further downstream. As one example, the video postprocessor may be embedded in display device 118, and there may be many components between video decoder 300 and display device 118. Accordingly, in examples where inverse DRA is performed in a video postprocessor, the metadata that includes the DRA parameters need to remain synchronized with the picture and pass through many different components where the metadata can be unsynchronized or lost relative to the picture.

Accordingly, by performing the inverse DRA within video decoder 300, there may not be a negative impact if the metadata that includes the DRA parameters becomes unsynchronized with the picture. Also, the DRA parameters may not need to pass through many components such as in examples where the inverse DRA is not performed until display device 118.

In the example techniques described in this disclosure, video encoder 200 and video decoder 300 may be configured to perform the inverse DRA operation as a part of a bumping process or as part of outputting a picture based on a timing parameter. A decoded picture buffer (DPB) maintains a set of pictures or frames that may be used as reference pictures for inter-prediction. The pictures stored in the DPB can be stored in the DRA domain.

The bumping process and a process that outputs picture based on a timing parameter define a manner in which pictures from the DPB are output and subsequently removed (e.g., so that new pictures can be stored in the DPB). In one or more examples, video encoder 200 and video decoder 300 may perform the inverse DRA as part of the bumping process or as part of removing a picture based on the timing parameter. For instance, video encoder 200 and/or video decoder 300 may determine that a picture stored in the DPB is to be output from the DPB. Subsequent to determining that the picture is to be output, video encoder 200 and/or video decoder 300 may perform a process of outputting the picture. At the process of outputting the picture, video encoder 200 and/or video decoder 300 may apply the inverse DRA to the picture.

In general, at the process of outputting the picture refers to an instance before the picture can be accessed by another component external to video decoder 300 (e.g., such as a video postprocessor). In one or more examples, at the process of outputting the picture refers to a series of sequential operations that results in outputting of the picture from the DPB. The series of operations may begin with selecting which picture is to be output and concludes with the selected picture being output and possibly later removed, when that picture is marked as "unused for reference." In some examples, the techniques that are performed "at the process of outputting the picture" may be followed by identifying which picture is to be output and performed before that picture is output (e.g., before the picture can be accessed by another component external to video decoder 300).

As one example, video encoder 200 and/or video decoder 300 select which picture is to be output (e.g., based on the bumping process or based on a timing parameter of when the picture is to be output), perform the inverse DRA operations and picture cropping (or picture cropping first and then inverse DRA operations) and output the picture. The picture storage buffer of the DPB that stores the outputting picture is then emptied to remove the picture from the DPB when the picture is marked as "unused for reference." In some examples, at the process of outputting the picture, video encoder 200 and/or video decoder 300 may perform a cropping operation to remove portions of the picture. The cropping operation may be optional in some examples and may occur before or after the inverse DRA operations in examples where cropping operations are performed.

Where cropping occurs after inverse DRA operations, the picture may not be further processed or modified after the cropping operations (but may be used as a reference picture in some examples) until the picture is removed from the DPB. In some examples, at the process of outputting the picture, where the cropping occurs before the inverse DRA operations, the picture may not be further processed or modified after the inverse DRA operations (but may be used as a reference picture in some examples) until the picture is removed from the DPB.

Accordingly, the outputting process includes selecting a picture to be output, outputting the picture, and then removing picture from the DPB. In between selecting the picture to be output and outputting the picture, there may be a cropping operation. Video encoder 200 and/or video decoder 300 may be configured to perform the inverse DRA operations at the process of outputting the picture such that the inverse DRA operations are performed after selecting the picture to be output and before outputting the picture or before removing the picture. The cropping operations may be performed before the inverse DRA operations or after the inverse DRA operations.

It should be understood that video encoder 200 may not need to apply the inverse DRA to the picture. In some examples, the inverse DRA techniques described in this disclosure are applicable only to video decoder 300. However, it may be possible for video encoder 200 to perform the example techniques.

As described in more detail in other parts of this disclosure, part of the bumping process or removing based on a timing parameter can also include cropping. In cropping, video encoder 200 and/or video decoder 300 may crop out parts of the picture that are not going to be displayed. For example, video encoder 200 may define a cropping window and signal information of the size of the cropping window (e.g., height and width). Video decoder 300 crops out parts of the picture that are outside the cropping window. Video encoder 200 and/or video decoder 300 may be configured to perform the cropping sequentially with the operations to apply the inverse DRA to the picture. For example, video encoder 200 and/or video decoder 300 may be configured to perform the cropping operation and then apply the inverse DRA. As another example, video encoder 200 and/or video decoder 300 may be configured to apply the inverse DRA and then perform the cropping on the result.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
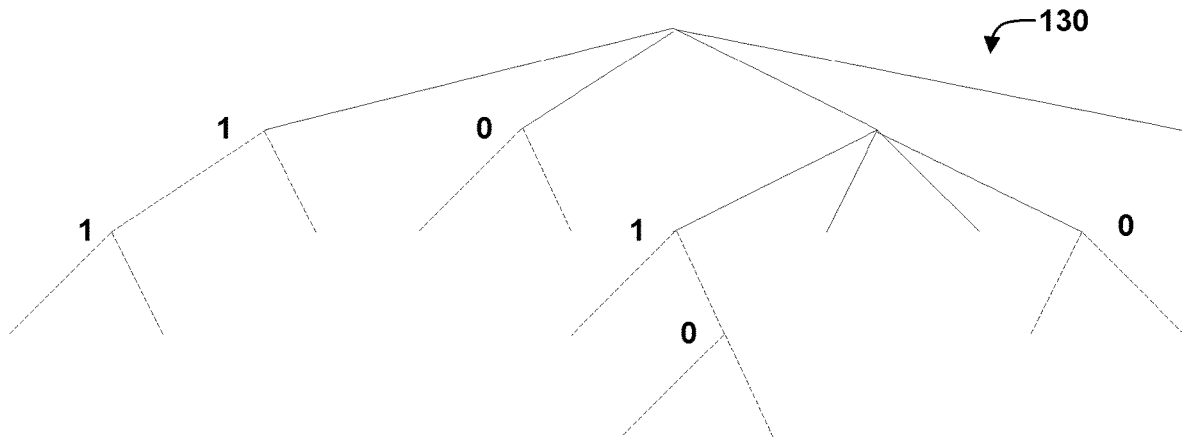
FIGS. 2A and 2B are conceptual diagrams illustrating an example quadtree binary tree (QTBT) structure, and a corresponding coding tree unit (CTU).
Figure 2B:
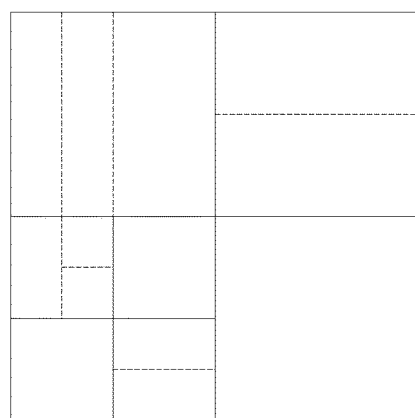

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

Figure 3:
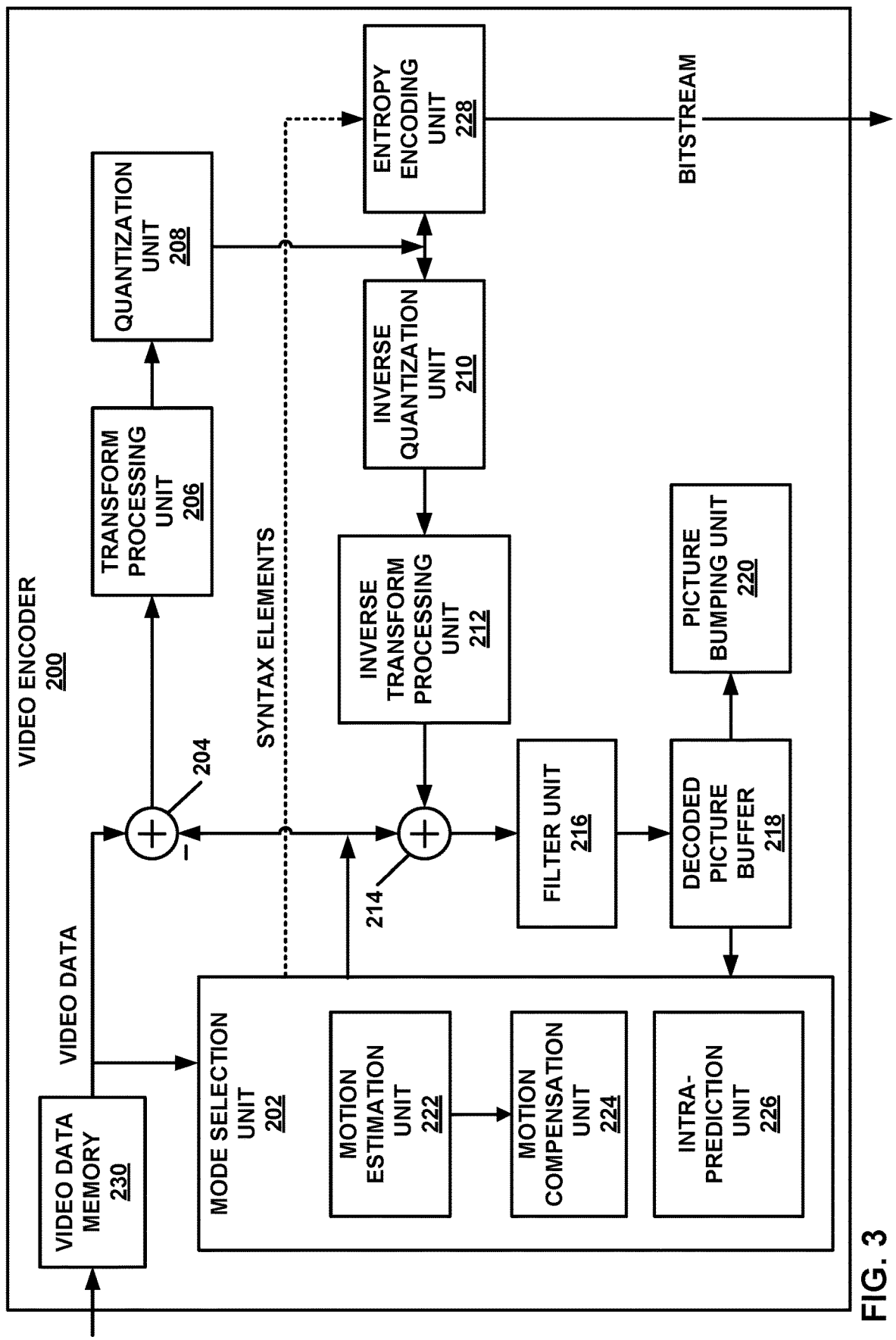
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding. As will be explained in more detail below, video encoder 200 may be configured to perform DRA operations using the techniques of this disclosure. Again, in some examples, a video preprocessor may perform the example operations for output to video encoder 200.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 228.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered.

Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 228 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 228 may entropy encode syntax elements received from other functional components of video encoder 200. For example, entropy encoding unit 228 may entropy encode quantized transform coefficient blocks from quantization unit 208. As another example, entropy encoding unit 228 may entropy encode prediction syntax elements (e.g., motion information for inter-prediction or intra-mode information for intra-prediction) from mode selection unit 202. Entropy encoding unit 228 may perform one or more entropy encoding operations on the syntax elements, which are another example of video data, to generate entropy-encoded data. For example, entropy encoding unit 228 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 228 may operate in bypass mode where syntax elements are not entropy encoded.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform example techniques described in this disclosure.

For example, video encoder 200 includes picture bumping unit 220 coupled to DPB 218. Picture bumping unit 220 may be configured to perform the inverse DRA of the pictures in the DRA domain stored in DPB 218. In some examples, picture bumping unit 220 may be configured to perform a cropping operation on the result of the inverse DRA or prior to performing the inverse DRA (e.g., in both cases, the cropping operation is sequential with the inverse DRA). Picture bumping unit 220 may be optional for video encoder 200. For example, video encoder 200 may not be configured to perform the inverse DRA techniques or the cropping techniques described in this disclosure. However, video encoder 200 may be configured to generate information that video decoder 300 needs to perform the inverse DRA and cropping operations.

Figure 4:
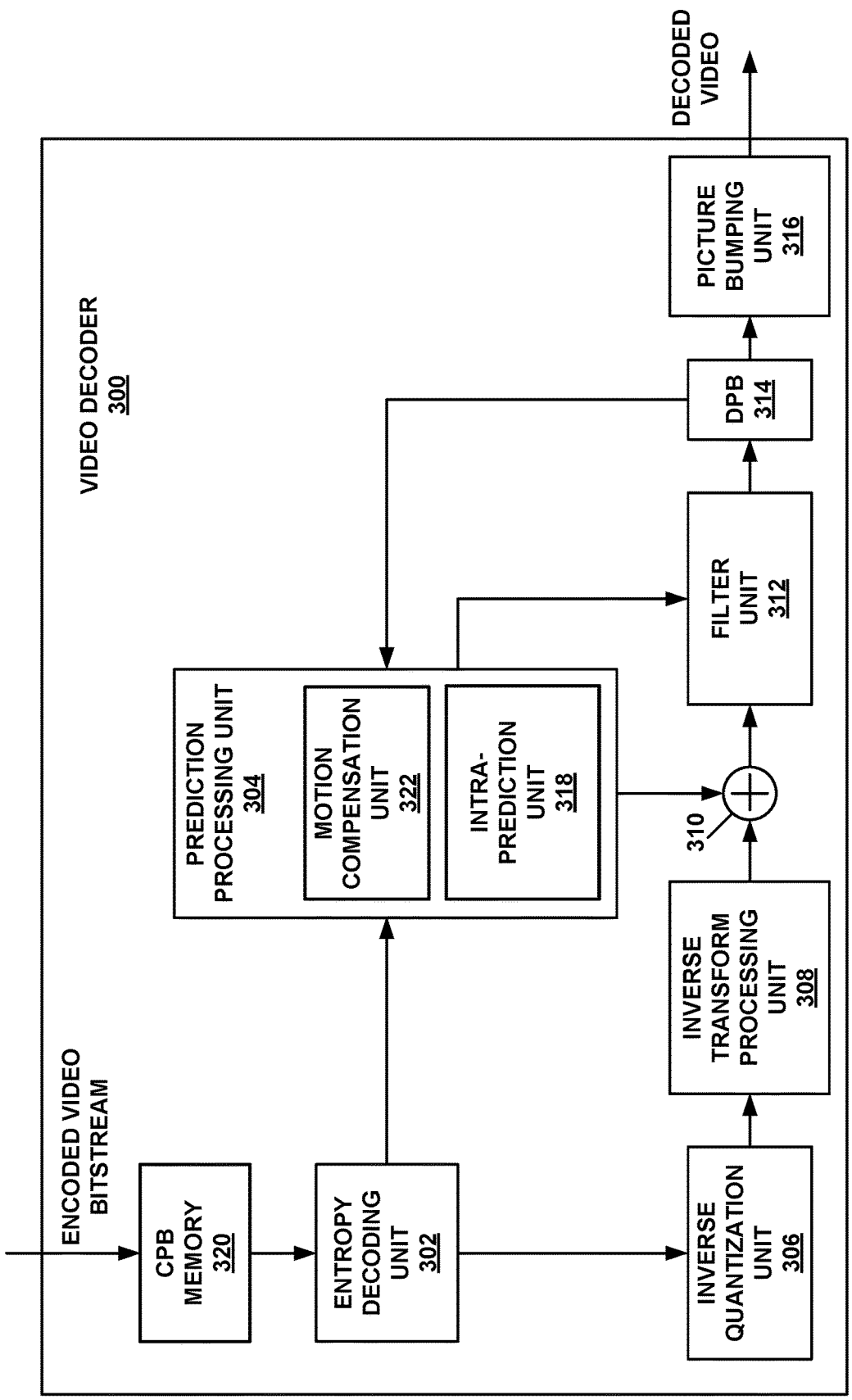
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. As will be explained in more detail below, video decoder 300 may be configured to perform DRA operations using the techniques of this disclosure. Again, in some examples, a video postprocessor may perform the example operations based on video data received from video decoder 300. The video postprocessor and video decoder 300, or the combination of the two, are examples of processing circuitry (e.g., fixed-function, programmable, or a combination of fixed-function and programmable) configured to perform one or more example techniques described in this disclosure.

For purposes of explanation, this disclosure describes video decoder 300 is described according to the techniques of JEM and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 322 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 322), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 322 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 322 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

As illustrated, video decoder 300 includes picture bumping unit 316. When a picture is to be output from DPB 314, the picture undergoes a bumping process. Picture bumping unit 316 may be configured to perform the bumping process. For example, the bumping process (also called a process of outputting a picture) may include applying an inverse DRA to the picture being output and, in some examples, a cropping process. The bumping process includes outputting a picture, and, in some examples, the subsequent removal of that picture from DPB 314 when that picture is no longer needed for inter-prediction.

In some examples, picture bumping unit 316 may be configured to output a picture from DPB 314 based on a timing parameter. For example, video encoder 200 may signal a DbpOutputTime[ ] parameter or video decoder 300 may determine the DbpOutputTime[ ] parameter. The DbpOutputTime[ ] parameter is an example of a timing parameter. The timing parameter indicates when a picture is expected to be output from DPB 314. Picture bumping unit 316 may be configured to output a picture from DPB 314 based on the timing parameter.

Picture bumping unit 316 may be configured to apply the inverse DRA to the picture and apply the cropping process (e.g., where the inverse DRA and the cropping process are applied sequentially). In some examples, for sequential application of inverse DRA and cropping process, picture bumping unit 316 may apply the inverse DRA and then apply the cropping process. In some examples, for sequential application of inverse DRA and cropping process, picture bumping unit 316 may apply the cropping process and then apply the inverse DRA. Example ways in which to perform the inverse DRA and the cropping process are described in more detail below.

As described above, video encoder 200 may encode video data (e.g., pictures) in the DRA domain where the pictures in the original domain are dynamic range adjusted (e.g., by a video preprocessor) to generate pictures in the DRA domain that are better suited for compression. Therefore, as part of reconstructing the video data (e.g., pictures), video decoder 300 reconstructs pictures that are in the DRA domain and stores the pictures that are in the mapped-domain in DPB 314.

In accordance with one or more example techniques described in this disclosure, prediction processing unit 304 (or possibly some other unit) may be configured to determine that a picture in the DRA domain (e.g., mapped-domain) stored in DPB 314 is to be output from DPB 314. Subsequent to determining that the picture in the DRA domain is to be output, picture bumping unit 316 may perform a process of outputting the picture in the DRA domain. At the process of outputting the picture in the DRA domain from the DPB, picture bumping unit 316 may apply inverse DRA to the picture, and sequential to the applying of the inverse DRA, picture bumping unit 316 may apply a conformance cropping window to the picture to perform the cropping operation.

In this manner, video decoder 300 represents an example of a video decoding device including a memory configured to store video data, and one or more processing units implemented in circuitry and configured to perform the example DRA operations described in this disclosure.

Next generation video applications are anticipated to operate with video data representing captured scenery with HDR and a WCG. Parameters of the utilized dynamic range and color gamut are two independent attributes of video content, and their specification for purposes of digital television and multimedia services are defined by several international standards. For example, ITU-R Rec. BT.709, "Parameter values for the HDTV standards for production and international programme exchange," and ITU-R Rec. BT.2020, "Parameter values for ultra-high definition television systems for production and international programme exchange," defines parameters for HDTV (high definition television) and UHDTV (ultra-high definition television), respectively, such as standard dynamic range (SDR) and color primaries that extend beyond the standard color gamut. Rec. BT.2100, "Image parameter values for high dynamic range television for use in production and international programme exchange" defines transfer functions and representations for HDR television use, including primaries that support wide color gamut representations. There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the maximum and minimum brightness (e.g., luminance) of the video signal. Dynamic range may also be measured in terms of 'f-stop,' where one f-stop corresponds to a doubling of a signal's dynamic range. In MPEG's definition, content that features brightness variation with more than 16 f-stops is referred as HDR content. In some terms, levels between 10 and 16 f-stops are considered as intermediate dynamic range, but it is considered HDR in other definitions. In some examples of this disclosure, HDR video content may be any video content that has a higher dynamic range than traditionally used video content with a standard dynamic range (e.g., video content as specified by ITU-R Rec. BT.709).

Figure 5:
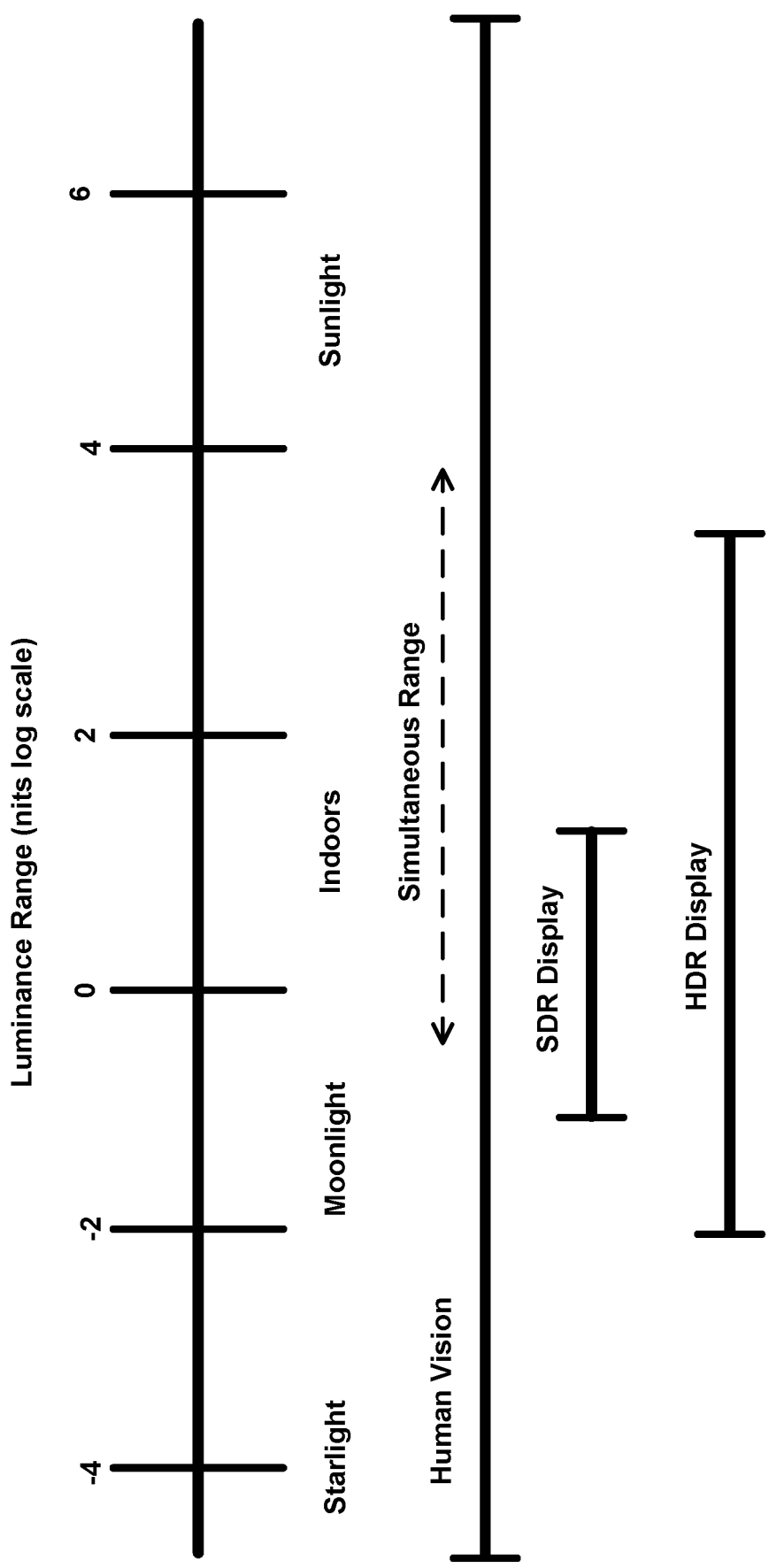
FIG. 5 is a conceptual drawing illustrating the concepts of HDR data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). Visualization of dynamic range provided by SDR of HDTV, expected HDR of UHDTV and HVS dynamic range is shown in FIG. 5, although the exact range may vary based on each individual and display.

Current video application and services are regulated by ITU Rec. 709 and provide SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Figure 6:
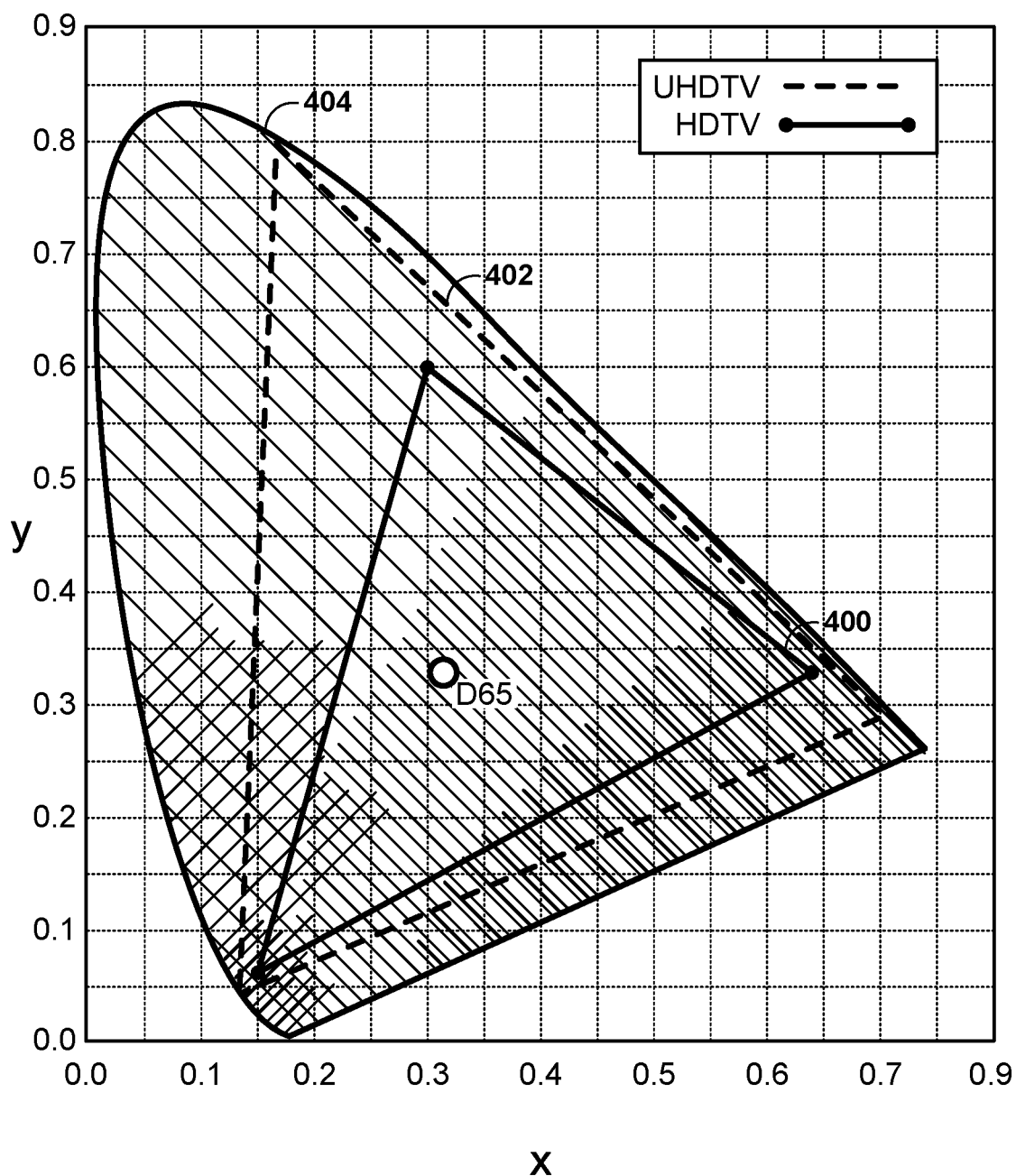
FIG. 6 is a conceptual diagram illustrating example color gamuts.

Another aspect for a more realistic video experience, besides HDR, is the color dimension. Color dimension is typically defined by the color gamut. FIG. 6 is a conceptual diagram showing an SDR color gamut (triangle 400 based on the BT.709 color primaries), and the wider color gamut that for UHDTV (triangle 402 based on the BT.2020 color primaries). FIG. 6 also depicts the so-called spectrum locus (delimited by the tongue-shaped area 404), representing the limits of the natural colors. As illustrated by FIG. 6 moving from BT.709 (triangle 400) to BT.2020 (triangle 402) color primaries aims to provide UHDTV services with about 70% more colors. D65 specifies an example white color for the BT.709 and/or BT.2020 specifications.

Examples of color gamut specifications for the DCI-P3, BT.709, and BT.2020 color spaces are shown in Table 1.

TABLE 1

Color gamut parameters
RGB color space parameters

| Color space | White point | | Primary colors | | | | | |
|---|---|---|---|---|---|---|---|---|
| | $xx_W$ | $yy_W$ | $xx_R$ | $yy_R$ | $xx_G$ | $yy_G$ | $xx_B$ | $yy_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the x and y values of the primary colors (e.g., red (R), green (G), and blue (B). The x and y values represent normalized values that are derived from the chromaticity (X and Z) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma format and a very wide color space (e.g., CIE XYZ). This representation targets high precision and is almost mathematically lossless. However, such a format for storing HDR/WCG video data may include a lot of redundancies and may not be optimal for compression purposes. A lower precision format with HVS-based assumptions may be utilized for state-of-the-art video applications.

Figure 7:
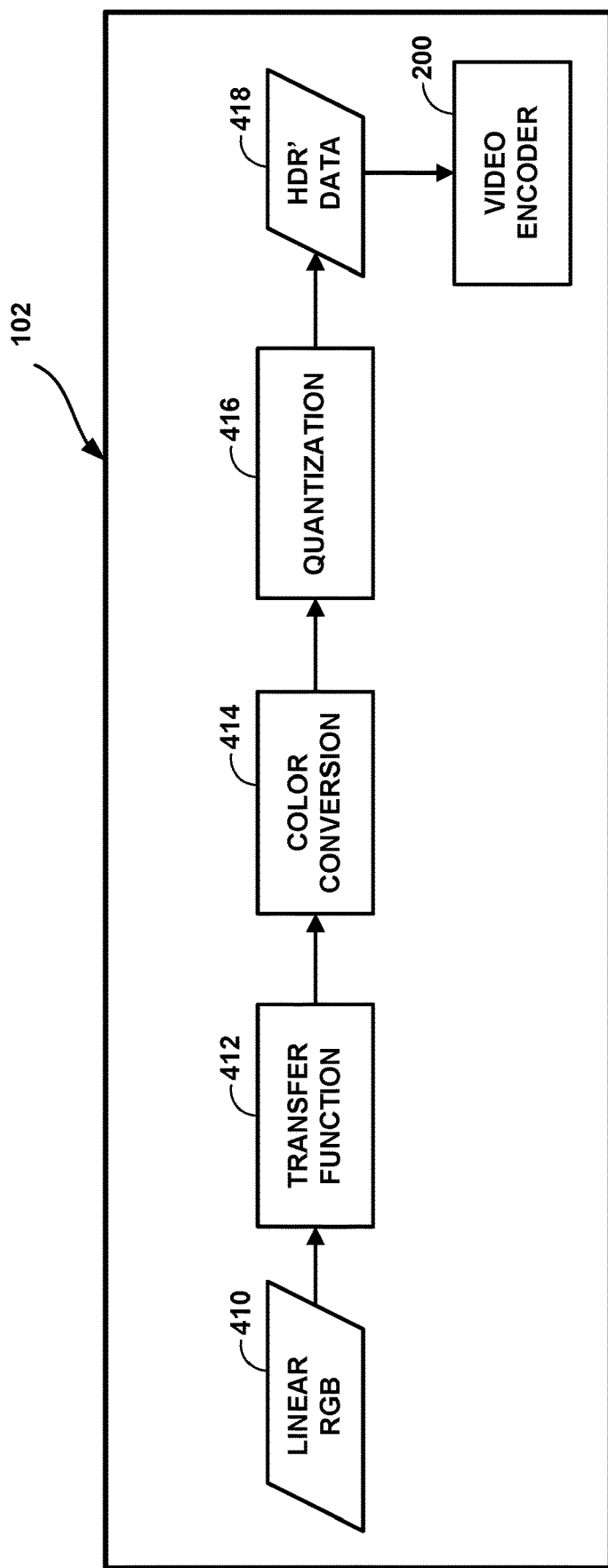
FIG. 7 is a flow diagram illustrating an example of HDR/WCG representation conversion.

One example of a video data format conversion process for purposes of compression includes three major processes, as shown in FIG. 7.

1. Non-linear transfer function (TF) for dynamic range compacting
2. Color Conversion to a more compact or robust color space
3. Floating-to-integer representation conversion (Quantization)

The techniques of FIG. 7 may be performed by source device 102. Linear RGB data 410 may be HDR/WCG video data and may be stored in a floating-point representation. Linear RGB data 410 may be compacted using a non-linear transfer function (TF) 412 for dynamic range compacting. Transfer function 412 may compact linear RGB data 410 using any number of non-linear transfer functions, e.g., the PQ (perceptual quantizer) TF as defined in SMPTE-2084. In some examples, color conversion process 414 converts the compacted data into a more compact or robust color space (e.g., a YUV or YCrCb color space) that is more suitable for compression by a hybrid video encoder (e.g., video encoder 200). This data is then quantized using a floating-to-integer representation quantization unit 416 to produce converted HDR' data 418 (e.g., mapped-domain data or data in a DRA domain). In this example HDR' data 418 is in an integer representation. The HDR' data 418 is now in a format more suitable for compression by a hybrid video encoder (e.g., video encoder 200 applying HEVC of other hybrid video coding techniques). The order of the processes depicted in FIG. 7 is given as an example and may vary in other applications. For example, color conversion may precede the TF process. In addition, additional processing, e.g. spatial subsampling, may be applied to color components.

Figure 8:
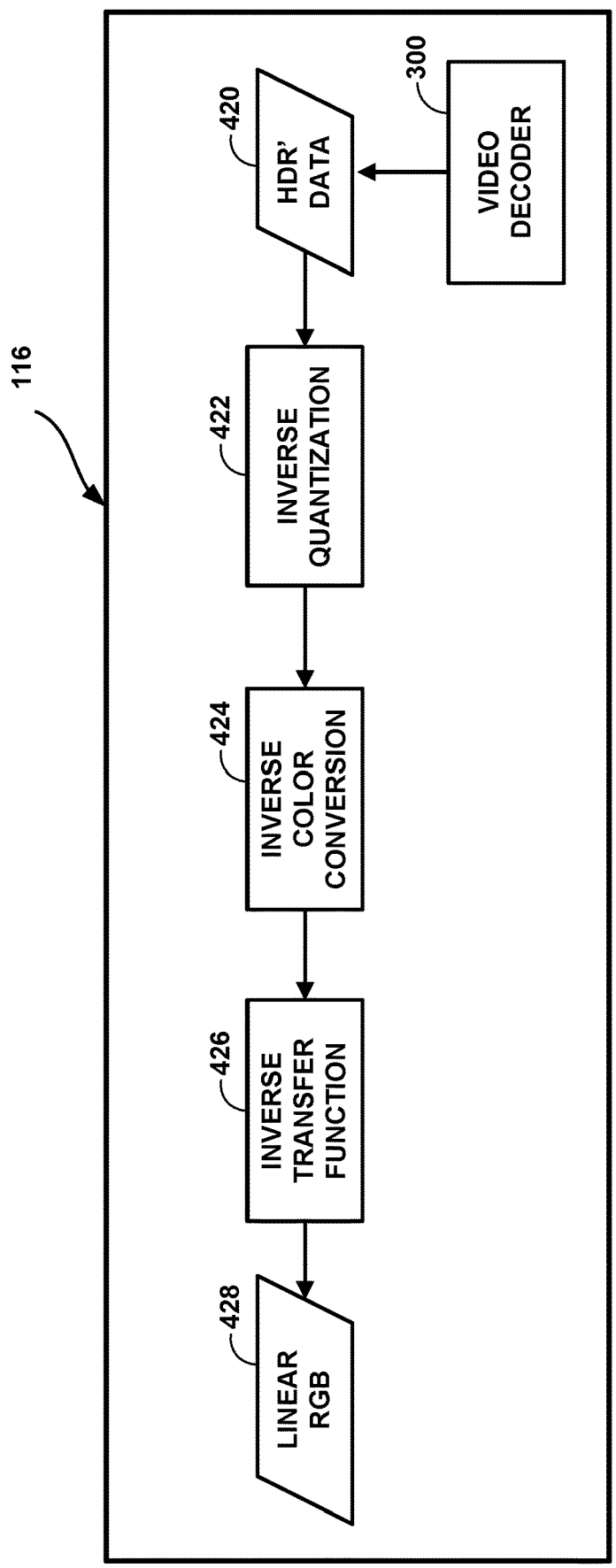
FIG. 8 is a flow diagram illustrating an example of HDR/WCG inverse conversion.

The inverse conversion at the decoder side is depicted in FIG. 8. The techniques of FIG. 8 may be performed by destination device 116. Converted HDR' data 420 may be obtained at destination device 116 through decoding video data using a hybrid video decoder (e.g., by video decoder 300 applying HEVC or other hybrid video coding techniques). HDR' data 420 may then be inverse quantized by inverse quantization unit 422. Then an inverse color conversion process 424 may be applied to the inverse quantized HDR' data. The inverse color conversion process 424 may be the inverse of color conversion process 414. For example, the inverse color conversion process 424 may convert the HDR' data from a YCrCb format back to an RGB format. Next, inverse transfer function 426 may be applied to the data to add back the dynamic range that was compacted by transfer function 412 to recreate the linear RGB data 428. In some examples, the example operations of performing the inverse conversion may be performed by and/or be part of video decoder 300 such as performed by and/or part of bumping unit 316.

Figure 9:
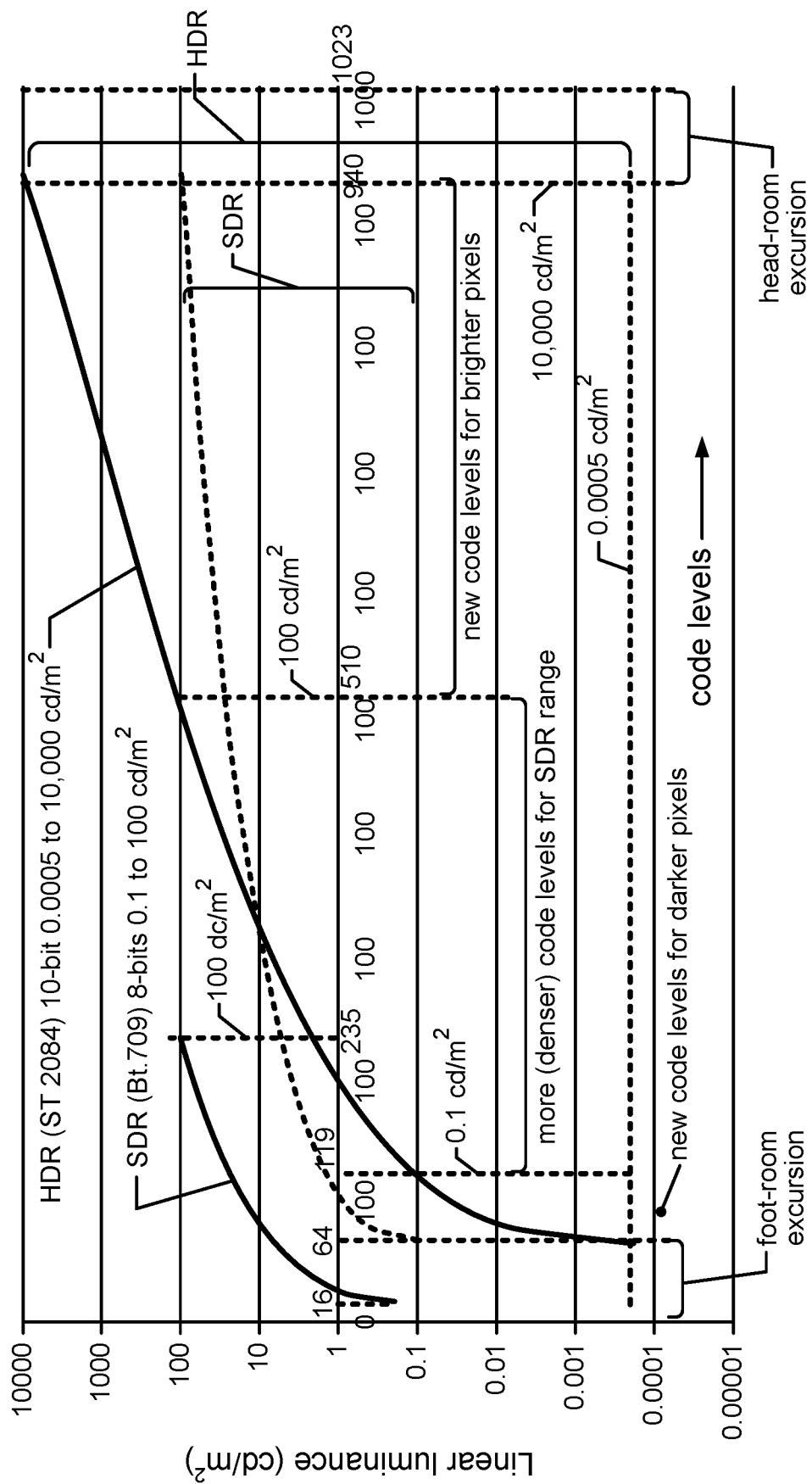
FIG. 9 is conceptual diagram illustrating example of Electro-optical transfer functions (EOTF) utilized for video data conversion (including SDR and HDR) from perceptually uniform code levels to linear luminance.

The techniques depicted in FIG. 7 will now be discussed in more detail. In general, a transfer function is applied to data (e.g., HDR/WCG video data) to compact the dynamic range of the data such that errors due to quantization are perceptually uniform (approximately) across the range of luminance values. Such compaction allows the data to be represented with fewer bits. In one example, the transfer function may be a one-dimensional (1D) non-linear function and may reflect the inverse of an electro-optical transfer function (EOTF) of the end-user display, e.g., as specified for SDR in Rec. 709. In another example, the transfer function may approximate the HVS perception to brightness changes, e.g., the PQ transfer function specified in SMPTE-2084 (ST2084) for HDR. The inverse process of the OETF is the EOTF (electro-optical transfer function), which maps the code levels back to luminance. FIG. 9 shows several examples of non-linear transfer function used as EOTFs. The transfer functions may also be applied to each R, G and B component separately.

The Specification of ST2084 defined the EOTF application as following. The TF is applied to a normalized linear R, G, B values which results in nonlinear representation of R'G'B'. ST2084 defines normalization by NORM=10000, which is associated with a peak brightness of 10000 nits (cd/m2).

$$R'=PQ\_TF(\max(0,\min(R/NORM,1)))$$

$$G'=PQ\_TF(\max(0,\min(G/NORM,1)))$$

$$B'=PQ\_TF(\max(0,\min(B/NORM,1))) \quad (1)$$

with $$PQ\_TF(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Figure 10:
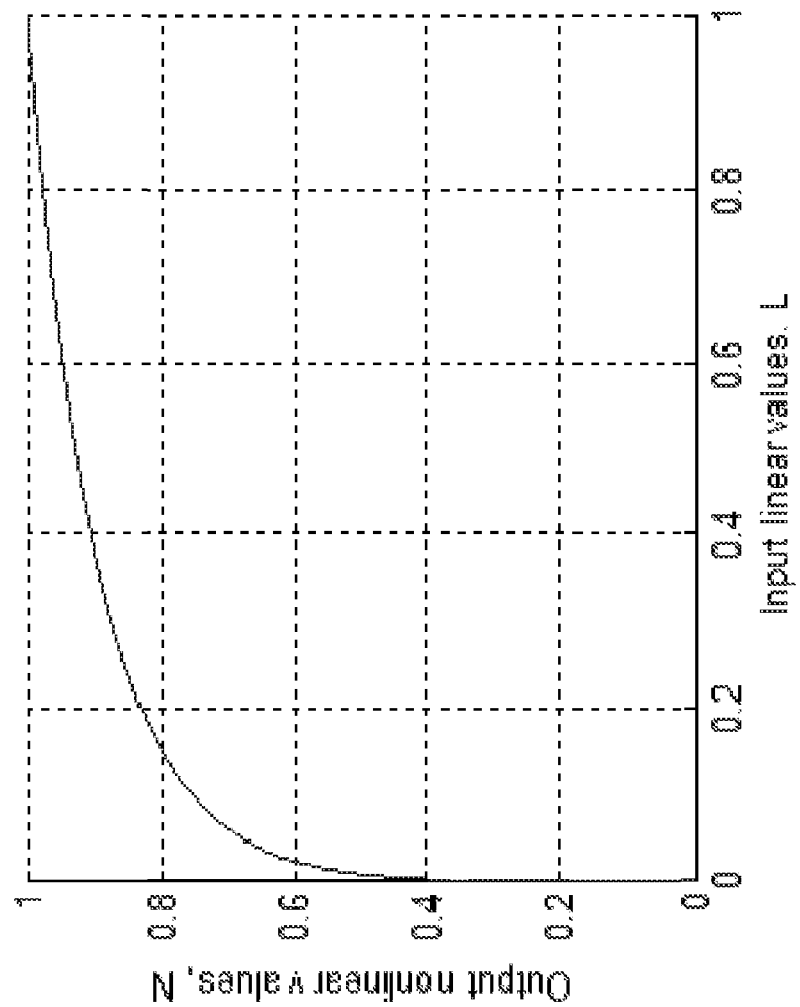
FIG. 10 is a graph illustrating a PQ transfer function.

With input values (linear color value) normalized to range 0 . . . 1 and normalized output values (nonlinear color value) PQ EOTF is visualized in FIG. 10. As it is seen from the curve, 1 percent (low illumination) of dynamical range of the input signal is converted to 50% of dynamical range of output signal.

Typically, an EOTF is defined as a function with a floating-point accuracy, thus no error is introduced to a signal with this non-linearity if inverse TF (so called OETF) is applied. Inverse TF (OETF) specified in ST2084 is defined as inversePQ function:

$$R=10000*inversePQ\_TF(R')$$

$$G=10000*inversePQ\_TF(G')$$

$$B=10000*inversePQ\_TF(B') \quad (2)$$

with inverse $PQ\_TF(N) = \left( \dfrac{\max[(N^{1/m_2} - c_1), 0]}{c_2 - c_3 N^{1/m_2}} \right)^{1/m_1}$ $m_1 = \dfrac{2610}{4096} \times \dfrac{1}{4} = 0.1593017578125$ $m_2 = \dfrac{2523}{4096} \times 128 = 78.84375$ $c_1 = c_3 - c_2 + 1 = \dfrac{3424}{4096} = 0.8359375$ $c_2 = \dfrac{2413}{4096} \times 32 = 18.8515625$ $c_3 = \dfrac{2392}{4096} \times 32 = 18.6875$ With floating-point accuracy, sequential application of EOTF and OETF provides a perfect reconstruction without errors. However, this representation is not optimal for streaming or broadcasting services. More compact representation with fixed bits accuracy of nonlinear R'G'B' data is described in following sections.

EOTF and OETF may be a subject of very active research currently, and TF utilized in some HDR video coding systems may be different from ST2084.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 118) and the linear color values produced by the display device.

RGB data is typically utilized as the input color space, since RGB is the type of data that is typically produced by image-capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y) and color information (CrCb) in different, less correlated components. In this context, a robust representation may refer to a color space featuring higher levels of error resilience when compressed at a constrained bitrate.

For modern video coding systems, a typically used color space is YCbCr, as specified in ITU-R BT.709 or ITU-R BT.709. The YCbCr color space in BT.709 standard specifies the following conversion process from R'G'B' to Y'CbCr (non-constant luminance representation):

$Y' = 0.2126 * R' + 0.7152 * G' + 0.0722 * B'$ (3)

$Cb = \dfrac{B' - Y'}{1.8556}$ $Cr = \dfrac{R' - Y'}{1.5748}$

The above can also be implemented using the following approximate conversion that avoids the division for the Cb and Cr components:

$Y'=0.212600*R'+0.715200*G'+0.072200*B'$ $Cb=-0.114572*R'-0.385428*G'+0.500000*B'$ $Cr=0.500000*R'-0.454153*G'-0.045847*B'$ (4)

The ITU-R BT.2020 standard specifies the following conversion process from R'G'B' to Y'CbCr (non-constant luminance representation):

$Y' = 0.2627 * R' + 0.6780 * G' + 0.0593 * B'$ (5)

$Cb = \dfrac{B' - Y'}{1.8814}$ $Cr = \dfrac{R' - Y'}{1.4746}$

The above can also be implemented using the following approximate conversion that avoids the division for the Cb and Cr components:

$Y'=0.262700*R'+0.678000*G'+0.059300*B'$ $Cb=-0.139630*R'-0.360370*G'+0.500000*B'$ $Cr=0.500000*R'-0.459786*G'-0.040214*B'$ (6)

It should be noted, that both color spaces remain normalized, therefore, for the input values normalized in the range 0 ... 1 the resulting values will be mapped to the range 0 ... 1. Generally, color transforms implemented with floating-point accuracy provide perfect reconstruction, thus this process is lossless.

The processing stages described above are typically implemented in floating-point accuracy representation, thus they may be considered as lossless. However, this type of accuracy can be considered as redundant and expensive for most of consumer electronics applications. For such services, input data in a target color space is converted to a target bit-depth fixed point accuracy. Certain studies show that 10-12 bits accuracy in combination with the PQ TF is sufficient to provide HDR data of 16 f-stops with distortion below the Just-Noticeable Difference (e.g., amount by which distortion needs to change in order to be noticeable). Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in target color space, in this example it is YCbCr, is shown below. Input values YCbCr represented in floating point accuracy are converted into a signal of fixed bit-depth BitDepthY for the Y value and BitDepthC for the chroma values (Cb, Cr).

$D_Y = \text{Clip1}_Y(\text{Round}((1<<(\text{BitDepth}_Y-8))*(219*Y'+16)))$ $D_{Cb} = \text{Clip1}_C(\text{Round}((1<<(\text{BitDepth}_C-8))*(224*Cb+128)))$ $$D_{Cr} = \text{Clip1}_C(\text{Round}((1<<(\text{BitDepth}_C-8))*(224*Cr+128))) \quad (7)$$

with

Round($x$)=Sign($x$)*Floor(Abs($x$)+0.5)

Sign($x$)=−1 if $x$<0, 0 if $x$=0, 1 if $x$>0

Floor($x$) the largest integer less than or equal to $x$

Abs($x$)=$x$ if $x$>=0, −$x$ if $x$<0

Clip1$_Y$($x$)=Clip3(0,(1<<BitDepth$_Y$)−1,$x$)

Clip1$_C$($x$)=Clip3(0,(1<<BitDepth$_C$)−1,$x$)

Clip3($x,y,z$)=$x$ if $z$<$x$, $y$ if $z$>$y$, $z$ otherwise

A dynamic range adjustment (DRA) process was proposed in "Dynamic Range Adjustment SEI to enable High Dynamic Range video coding with Backward-Compatible Capability," D. Rusanovskyy, A. K. Ramasubramonian, D. Bugdayci, S. Lee, J. Sole, M. Karczewicz, VCEG document COM16-C 1027-E, September 2015. The authors proposed to implement DRA as a piece-wise linear function f(x) that is defined for a group of non-overlapped dynamic range partitions (ranges) {Ri} of input value x, were i is an index of the range with range of 0 to N−1, inclusive, and where N is the total number of ranges {Ri} utilized for defining DRA function. Assume that ranges of the DRA are defined by minimum and a maximum x value that belong to the range Ri, e.g., [$x_i$, $x_{i+1}$−1] where $x_i$ and $x_{i+1}$ denote minimum value of the ranges $R_i$ and $R_{i+1}$ respectively. Applied to Y color component of the video (luma), DRA function Sy is defined through a scale $S_{y,i}$ and offset $O_{y,i}$ which are applied to every $x \in [x_i, x_{i+1}-1]$, thus $S_y = \{S_{y,i}, O_{y,i}\}$.

With this, for any Ri, and every $x \in [x_i, x_{i+1}-1]$, the output value X is calculated as follows:

$$X = S_{y,i} * (x - O_{y,i}) \quad (8)$$

For the inverse DRA mapping process for luma component Y conducted at the decoder, DRA function Sy is defined by inverse of scale $S_{y,i}$ and offset $O_{y,i}$ values which are applied to every $X \in [X_i, X_{i+1}-1]$. With this, for any Ri, and every $X \in [X_i, X_{i+1}-1]$, reconstructed value x is calculated as follows:

$$x = X/S_{y,i} + O_{y,i} \quad (9)$$

The forward DRA mapping process for chroma components Cb and Cr were defined as following. Example is given with term "u" denoting sample of a Cb color component that belongs to range Ri, $u \in [u_i, u_{i+1}-1]$, thus $S_u = \{S_{u,i}, O_{u,i}\}$:

$$U = S_{u,i} * (u - O_{y,i}) + \text{Offset} \quad (10)$$

where Offset is equal to $2^{(bitdepth-1)}$ denotes the bi-polar Cb, Cr signal offset.

The inverse DRA mapping process conducted at the decoder for chroma components Cb and Cr were defined as follows. Example is given with U term denoting sample of remapped Cb color component which belongs to the range Ri, $U \in [U_i, U_{i+1}-1]$:

$$u = (U - \text{Offset})/S_{u,i} + O_{y,i} \quad (11)$$

where Offset is equal to $2^{(bitdepth-1)}$ denotes the bi-polar Cb, Cr signal offset.

Luma-driven chroma scaling (LCS) was proposed in JCTVC-W0101, "HDR CE2: Report on CE2.a-1 LCS," A. K. Ramasubramonian, J. Sole, D. Rusanovskyy, D. Bug-dayci, M. Karczewicz. In this paper, a method to adjust chroma information, e.g., Cb and Cr, by exploiting brightness information associated with the processed chroma sample was proposed. Similarly, to the DRA approach of VCEG document COM16-C 1027-E, JCTVC-W010, it was proposed to apply to a chroma sample a scale factor $S_u$ for Cb and $S_{v,i}$ for Cr. However, instead of defining a DRA function as a piece-wise linear function $S_u = \{S_{u,i}, O_{u,i}\}$ for a set of ranges {$R_i$} accessible by chroma value u or v as in Equations (3) and (4), the LCS approach proposed to utilize luma value Y to derive a scale factor for chroma sample. With this, forward LCS mapping of the chroma sample u (or v) is conducted as:

$$U = S_{u,i}(Y) * (u - \text{Offset}) + \text{Offset} \quad (12)$$

The inverse LCS process conducted at the decoder side is defined as following:

$$u = (U - \text{Offset})/S_{u,i}(Y) + \text{Offset} \quad (13)$$

In more details, for a given pixel located at (x, y), chroma samples Cb(x, y) or Cr(x, y) are scaled with a factor derived from its LCS function $S_{Cb}$ (or $S_{Cr}$) accessed by its luma value Y'(x, y).

At the forward LCS for chroma samples, Cb (or Cr) values and their associated luma value Y' are taken as an input to the chroma scale function $S_{Cb}$ (or $S_{Cr}$) and Cb or Cr are converted into Cb' and Cr' as shown in Equation 9. At the decoder side, the inverse LCS is applied, reconstructed Cb' or Cr' are converted to Cb, or Cr as is shown in Equation (10).

$$Cb'(x, y) = S_{Cb}(Y'(x, y)) * Cb(x, y), \quad (14)$$
$$Cr'(x, y) = S_{Cr}(Y'(x, y)) * Cr(x, y)$$

$$Cb(x, y) = \frac{Cb'(x, y)}{S_{Cb}(Y'(x, y))} \quad (15)$$

$$Cr(x, y) = \frac{Cr'(x, y)}{S_{Cr}(Y'(x, y))}$$

Figure 11:
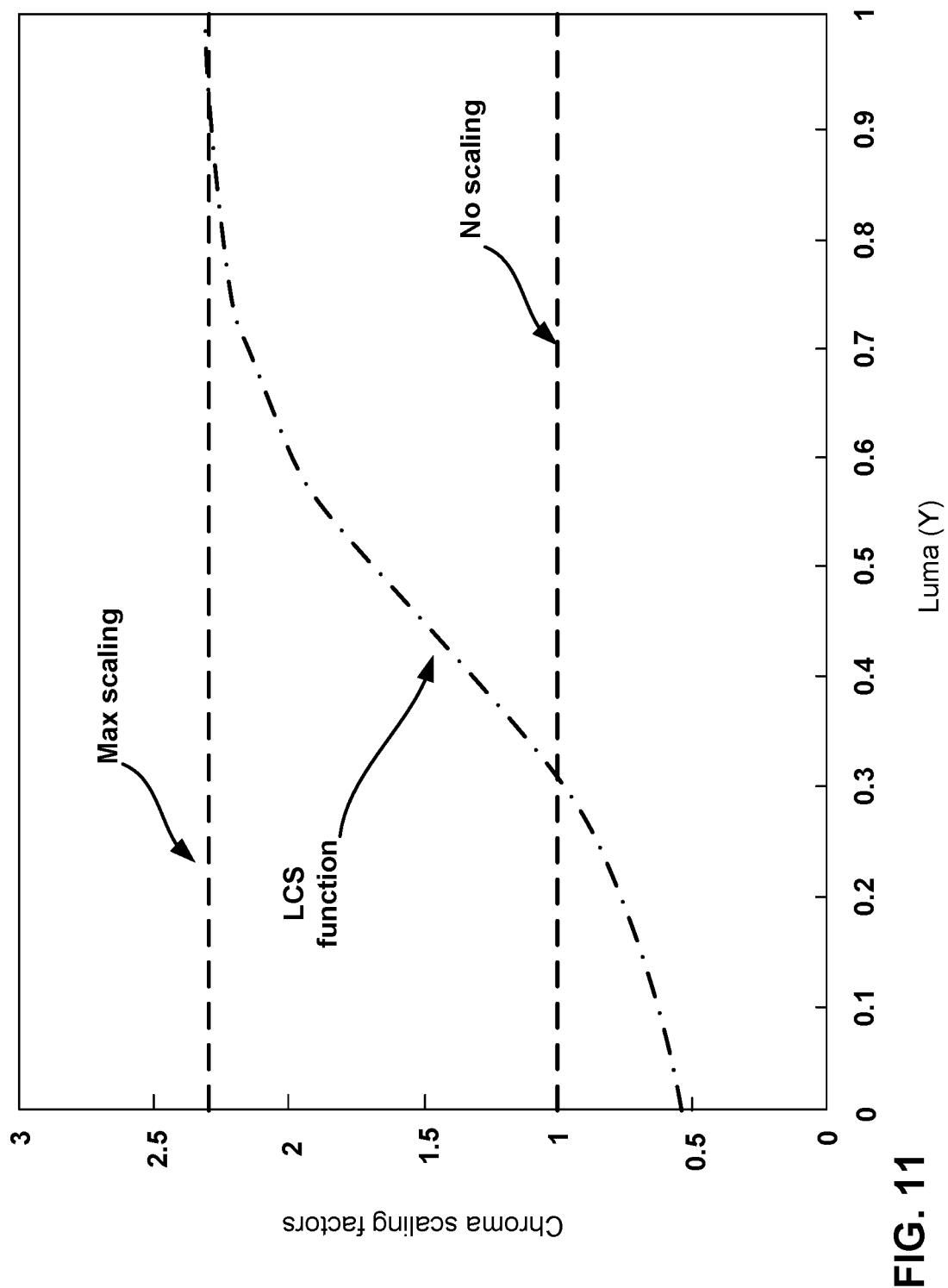
FIG. 11 is a graph illustrating a luma-driven chroma scaling (LCS) function.

FIG. 11 shows an example of LCS functions, with the LCS function in the example, chroma components of pixels with smaller values of luma are multiplied with smaller scaling factors.

In examples, described in this disclosure video samples are input to the encoder (e.g., video encoder 200); forward DRA, potentially in conjunction with LCS, may be applied at the encoder (e.g., video encoder 200) to result in mapped samples. The video samples before the application of the forward DRA is said to be in the "original domain; the mapped samples are referred to be in the "mapped/DRA" domain.

Similarly, the video samples right after reconstruction (assuming inverse DRA is not part of the reconstruction process) is said to be in the "mapped/DRA" domain and the video samples after the application of the inverse DRA process is referred to be in the original domain.

The relationship between DRA sample scaling and quantization parameters (QPs) of a video codec will now be discussed. To adjust compression ratio at encoders, block transform-based video coding schemes, such as HEVC, utilize a scalar quantizer, which is applied to block transform coefficients.

$$Xq = X/\text{scalerQP}$$

where Xq is a quantized codevalue of the transform coefficient X produced by applying scaler scalerQP derived from QP parameter. In most codecs, the quantized codevalue would be approximated to an integer value (e.g. by rounding). In some codecs, the quantization may be a different function which depends not just on the QP but also on other parameters of the codec.

The scaler value scalerQP is controlled with Quantization Parameter (QP) with the relationship between QP and scalar quantizer defined as following, where k is a known constant:

$$\text{scalerQP}=k*2^{(QP/6)} \qquad (16)$$

The inverse function defines relationship between scalar quantizer applied to transform coefficient and QP of HEVC as following:

$$QP=\ln(\text{scalerQP}/k)*6/\ln(2); \qquad (17)$$

Respectively, additive change in the QP value, e.g. deltaQP, would result in multiplicative change in the scalerQP value applied to the transform coefficients. DRA is effectively applying scaleDRA value to the pixel sample values, and taking into consideration transform properties, can be combined with scalerQP values as following:

$$Xq=T(\text{scaleDRA}*x)/\text{scaleQP}$$

where Xq are quantized transform coefficients produced by transform T of the scaled x sample values and scaled with scaleQP applied in the transform domain. Thus, applying multiplicator scaleDRA in the pixel domain results in effective change of scaler quantizer scaleQP, which is applied in the transform domain. This in turn can be interpreted in the additive change of QP parameter applied to the current processed block of data:

$$dQP=\log 2(\text{scaleDRA})*6; \qquad (18)$$

where dQP is approximate QP offset introduced by HEVC by deploying DRA on the input data.

Chroma QP dependency on the luma QP value will now be discussed. Some of state-of-the-art video coding designs, such as HEVC and newer, may utilize a predefined dependency between luma and chroma QP values effectively applied to process currently coded block Cb. Such dependency may be utilized to achieve an optimal bitrate allocation between luma and chroma components.

Example of such dependency is represented by Table 8-10 of the HEVC specification, where a QP value applied for decoding of the chroma samples are derived from QP values utilized for decoding luma samples. The relevant section where the chroma QP value is derived based on the QP value of the corresponding luma sample (QP value applied to the block/TU, corresponding luma sample belongs to), chroma QP offsets and Table 8-10 of HEVC specification is reproduced below:

When ChromaArrayType is not equal to 0, the following applies:

The variables $qP_{Cb}$ and $qP_{Cr}$ are derived as follows:
If tu_residual_act_flag[xTbY][yTbY] is equal to 0, the following applies:

$qPi_{Cb}=\text{Clip3}(-QpBd\text{Offset}_C,57,Qp_Y+pps\_cb\_qp\_\text{offset}+\text{slice}\_cb\_qp\_\text{offset}+CuQp\text{Offset}_{Cb})$ (8-287)

$qPi_{Cr}=\text{Clip3}(-QpBd\text{Offset}_C,57,Qp_Y+pps\_cr\_qp\_\text{offset}+\text{slice}\_cr\_qp\_\text{offset}+CuQp\text{Offset}_{Cr})$ (8-288)

Otherwise (tu_residual_act_flag[xTbY][yTbY] is equal to 1), the following applies:

$qPi_{Cb}=\text{Clip3}(-QpBd\text{Offset}C,57,QpY+PpsActQpOffset}Cb+\text{slice}\_\text{act}\_cb\_qp\_\text{offset}+CuQp\text{Offset}Cb)$ (8-289)

$qPi_{Cr}=\text{Clip3}(-QpBd\text{Offset}C,57,QpY+PpsActQpOffset}Cr+\text{slice}\_\text{act}\_cr\_qp\_\text{offset}+CuQp\text{Offset}Cr)$ (8-290)

If ChromaArrayType is equal to 1, the variables $qP_{Cb}$ and $qP_{Cr}$ are set equal to the value of $Qp_C$ as specified in Table 8-10 based on the index qPi equal to $qPi_{Cb}$ and $qPi_{Cr}$, respectively.

Otherwise, the variables $qP_{Cb}$ and $qP_{Cr}$ are set equal to Min(qPi, 51), based on the index qPi equal to $qPi_{Cb}$ and $qPi_{Cr}$, respectively.

The chroma quantization parameters for the Cb and Cr components, $Qp'_{Cb}$ and $Qp'_{Cr}$, are derived as follows:

$$Qp'_{Cb}=qP_{Cb}+QpBd\text{Offset}_C \qquad (8\text{-}291)$$

$$Qp'_{Cr}=qP_{Cr}+QpBd\text{Offset}_C \qquad (8\text{-}292)$$

TABLE 8-10

Specification of $Qp_C$ as a function of qPi for ChromaArrayType equal to 1

| | qPi | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | = qPi | 29 | 30 | 31 | 32 | 33 | 33 | 34 | 34 | 35 | 35 | 36 | 36 | 37 | 37 | = qPi − 6 |

The derivation of a chroma scaling factor for DRA will now be discussed.

In video coding systems employing both, the uniform scalar quantization in transform domain and pixel domain scaling with DRA, derivation of the scale DRA value applied to chroma samples (Sx) can be dependent on the following:

$S_Y$: Luma scale value of the associated luma sample $S_{CX}$: Scale derived from the gamut of the content, where CX stands for Cb or Cr as applicable $S_{corr}$: correction scale term based for accounting for mismatch in transform coding and DRA scaling, e.g. to compensate dependency introduced by Table 8-10 of the HEVC $$S_X=\text{fun}(S_Y,S_{CX},S_{corr}).$$

One example is a separable function defined as follows: $S_X=f1(S_Y)*f2(S_{CX})*f3(S_{corr})$ The above describes example ways in which the DRA operations are performed. The following describes a bumping process of outputting pictures that are in the DRA domain (e.g., mapped-domain).

The following describes the "bumping operation." The decoded picture buffer (DPB) maintains a set of pictures/frames that may be used as a reference(s) for inter-picture prediction in the coding loop of the codec. Depending on the coding state, one or more pictures may be output for consumption by external application or be read by an external application. Depending on a coding order, DPB size or other condition, a picture that no longer has use in coding loop and was consumed by an external application may be removed from the DPB and/or be replaced by a newer reference picture. The process of outputting of pictures from the DPB and potential removal of pictures is referred to as a bumping process. An example of a bumping process defined for HEVC is quoted below. Below, reference is made to PicOrderCntVal, or POC value. The POC value indicates the output order for a picture (e.g., pictures having higher POC values are output later than pictures having smaller POC values). The output order (or display order) need not be the same as the coding order. For instance, a first picture is output before a second picture may have been decoded after the second picture.

C.5.2.4 "Bumping" Process

The "bumping" process consists of the following ordered steps:
1. The picture that is first for output is selected as the one having the smallest value of PicOrderCntVal of all pictures in the DPB marked as "needed for output".
2. The picture is cropped, using the conformance cropping window specified in the active SPS for the picture, the cropped picture is output, and the picture is marked as "not needed for output".
3. When the picture storage buffer that included the picture that was cropped and output contains a picture marked as "unused for reference", the picture storage buffer is emptied.
   NOTE—For any two pictures picA and picB that belong to the same CVS and are output by the "bumping process", when picA is output earlier than picB, the value of PicOrderCntVal of picA is less than the value of PicOrderCntVal of picB.

Above, reference is made to the "conformance cropping window" specified in an active sequence parameter set (SPS). Section 7.4.3.2.1 of the HEVC standard defines General sequence parameter set RB SP semantics, and defines an example of conformance cropping window as: The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive. The value of SubWidthC*(conf_win_left_offset+ conf_win_right_offset) shall be less than pic_width_in_luma_samples, and the value of SubHeightC*(conf_win_ top_offset+conf_win_bottom_offset) shall be less than pic_height_in_luma_samples. When ChromaArrayType is not equal to 0, the corresponding specified samples of the two chroma arrays are the samples having picture coordinates (x/SubWidthC, y/SubHeightC), where (x, y) are the picture coordinates of the specified luma samples. In some examples, the conformance cropping window offset parameters are only applied at the output. In some examples, all internal decoding processes are applied to the uncropped picture size. The variables identified above for the conformance cropping window are example variables from the HEVC standard. In one or more non-limiting examples, the definitions of the variables may be the same as that from the HEVC standard, but some modification to the definitions is possible.

Dynamic range adjustment (DRA) may be applied to video samples in a block/picture thus producing samples in the "mapped-domain" which is more efficient representation for compression. In some examples, video coding is conducted in the mapped domain (e.g., DRA domain), thus pictures in mapped domain can be held in the DPB for reference for inter-prediction. The inverse DRA can be applied to pictures the DPB prior to being output to convert the pictures to the original domain.

For example, for inter-prediction, pictures stored in DPB 314 can be in the DRA domain. This is because the pictures stored in DPB 314 are reconstructed based on video data representing an encoded picture. The encoded picture is in the DRA domain because video encoder 200 encodes pictures in the DRA domain.

There may be technical problems associated with ways in which to perform inverse DRA at video decoder 300. For example, video decoder 300 may be configured to convert the DRA domain pictures into the original domain (e.g., by applying the inverse DRA). However, there may be certain technical problems when applying the inverse DRA such as with storing or with using the pictures in the original domain as reference pictures.

In one example, a decoded picture buffer (DPB) 314 contains pictures in the mapped/DRA domain for referencing in coding loop (e.g., for use in inter-prediction). For purpose of output, a separate picture buffer and/or additional space in the DPB can be used to also store pictures in the original domain (post inverse DRA). This results in, in the worst case, a doubling of the decoded picture buffer size (e.g., doubling the size of DPB 314). For implementations that are sensitive to memory requirements (e.g. additional memory requirement may translate to a larger area on the chip/semiconductor), such an increased requirement of DPB size can be expensive.

For instance, in some examples, it may be possible that DPB 314 stores a picture in the DRA domain. In addition, unlike the example illustrated in FIG. 4, picture bumping unit 316 applies the inverse DRA and stores the result back in DPB 314. In this example, DPB 314 stores a picture in the DRA domain and also stores the same picture in the original domain (e.g., the result of the inverse DRA). This can result in doubling the size of DPB 314. Then, during the bumping process, video decoder 300 may output the picture in the original domain for further processing such as displaying the picture and/or delete the picture in the DRA domain if marked as "unused for reference." For example, the picture in the original domain is ready to be output for display and the picture in the DRA domain can be used for inter-prediction. However, in this case, there are two pictures with the same picture order count (POC) value, which can cause problems with the bumping process since two different pictures are identified by the same POC value.

In some examples, rather than storing both DRA domain pictures and original domain pictures in DPB 314, it may be possible to only store original domain pictures in DPB 314. For example, unlike the example illustrated in FIG. 4, an inverse DRA unit (not shown) may be before DPB 314 and perform the inverse DRA on the picture for storage in DPB 314. However, there may be technical disadvantages to such techniques. As mentioned above, for inter-prediction, pictures in the DRA domain may be needed and not in the original domain. However, in this case, DPB 314 may store pictures in the original domain. Therefore, an on-the-fly conversion of the original domain pictures in DPB 314 to the DRA domain would be needed when a picture in DPB 314 (now stored in the original domain) is needed for inter-prediction.

That is, in one example, DPB 314 contains pictures in the original domain, which is ready for output. For purpose of referencing picture in the coding loop (e.g., inter-prediction), "on-the-fly" forward DRA mapping is applied before using the samples and inverse DRA mapping is applied at the writing samples to DPB 314 (e.g., via the inverse DRA unit) as output of coding. In some coding architectures, multiple two-way DRA mapping operations may be applied. Such multiple operations may result in more computational complexity or processing power for video decoder 300.

This disclosure describes several example methods to improve dynamic range adjustment and its integration with hybrid transform-based video codecs, including signaling. It is to be understood that one or more of these methods may be used independently, or in combination with other methods.

In one example, video encoder 200 or video decoder 300 can perform inverse dynamic range adjustment (DRA) to the pictures at the bumping process or at a time indicated by the timing parameter, sequentially to the application of the conformance cropping window. Again, the timing parameter indicates when a picture is expected to be output. As one example, video decoder 300 may determine that a picture in DRA domain stored in DPB 314 is to be output from DPB 314. As one example, video decoder 300 (e.g., via prediction processing unit 304 or some other circuitry) may determine that DPB 314 is full (e.g., based on DPB 314 size). There may be other cases for which video decoder 300 determines that a picture in the DRA domain stored in DPB 314 is to be output such as coding state, coding order, and the like.

Subsequent to determining that the picture in the DRA domain is to be output, video decoder 300 may perform a process of outputting the picture in the DRA domain from DPB 314. For example, in response to determining that the picture in the DRA domain is to be output, video decoder 300 may output the picture.

At the process of outputting the picture in the DRA domain, video decoder 300 may apply inverse DRA to the picture. For example, as part of the bumping process or picture output based on timing parameter, picture bumping unit 316 may apply inverse DRA to the picture. In one or more examples, at the process of outputting the picture refers to a series of sequential operations that results in removal of the picture from the DPB 314. The series of operations may begin with selecting which picture is to be output and concludes with the selected picture being removed, when that picture is marked as "unused for reference." In some examples, the techniques that are performed "at the process of outputting the picture" may be followed by identifying which picture is to be output and performed before that picture is removed.

As one example, picture bumping unit 316 may determine which picture is to be output (e.g., marked as needed for output) and output that picture and mark the picture as not needed for output. Video decoder 300 may then mark the picture as unused for reference (when that picture is no longer needed as a reference picture), and the picture buffer in DPB 314 that stores the picture is emptied. The techniques that are performed "at the process of outputting the picture" may be in between determination of which picture is to be output and performed before removal from DPB 314 (e.g., before the picture buffer in DPB 314 is emptied) or performed before the picture is output from the picture buffer that stores the picture.

Sequential to applying the inverse DRA, video decoder 300 may apply a conformance cropping window to the picture. As one example, the inverse DRA mapping is applied, with video encoder 200 or video decoder 300 (e.g., by picture bumping unit 220 of video encoder 200 or picture bumping unit 316 of video decoder 300), to the output pictures in the bumping process following the application of the conformance cropping window. As one example, the inverse DRA mapping is applied, with video encoder 200 or video decoder 300 (e.g., by picture bumping unit 220 of video encoder 200 or picture bumping unit 316 of video decoder 300), to the output pictures in the bumping process prior the application of the conformance cropping window. In yet another example, application of inverse mapping may be combined with the conformance cropping window process.

As described in more detail, video encoder 200 and video decoder 300 may be configured to perform the inverse DRA based on one or more DRA parameters. Video encoder 200 may signal the parameters and video decoder 300 may receive the DRA parameters. In some examples, one or more sets of dynamic range adjustment (DRA) parameters may be signaled by video encoder 200 for a picture such that two blocks in the picture may have different DRA mapping applied. Video decoder 300 may be configured to receive and parse such parameters. When a bumping process of such a picture is invoked or when the timing parameter indicates that the picture is to be output, the inverse DRA mapping corresponding to each sample/block is applied.

In other words, video decoder 300 may receive information indicating the DRA parameters for blocks of the picture. A first set of the DRA parameters are for a first block of the picture and a second set of the DRA parameters are for a second block of the picture. The values of one or more of the first set of DRA parameters may be different from the values of one or more of the second set of DRA parameters. To apply the inverse DRA, video decoder 300 (e.g., via picture bumping unit 316) may apply the inverse DRA for the first block based on the first set of DRA parameters for the first block and apply the inverse DRA for the second block based on the second set of DRA parameters for the second block.

In the above example, two different blocks are described as having different DRA parameters (e.g., DRA parameters on a block-by-block basis). In some examples, it may be possible for there to be DRA parameters on a region-by-region basis, where a region includes one or more blocks (e.g., a slice or tile).

In some examples, rather than determining DRA parameters on a block-by-block basis or region-by-region, it may be possible to determine DRA parameters on a sample-by-sample basis. For example, video decoder 300 receives one or more sets of DRA parameters (e.g., parameters for the DRA process or the inverse DRA process). In some examples, video decoder 300 derives the DRA parameters for the inverse DRA from the DRA parameters for the DRA process. Video decoder 300 applies the inverse DRA mapping in the bumping process or when the timing parameter indicates that the picture is to be output. As described above, in some examples, the decoded picture buffer (e.g., DPB 314) stores pictures in the DRA mapped domain when the DRA is applied to the encoded video.

Some methods described above may be applied at an encoder (e.g., video encoder 200) or decoder (e.g., video decoder 300), or both. These methods may also apply to DPB management systems that are not based on reference picture sets (e.g. AVC codec).

Below are some examples of how one or more techniques described above may be implemented. For example, as described above, video encoder 200 and video decoder 300 may be configured to apply an inverse DRA. The following provides some example ways in which inverse DRA is applied. The example techniques of applying the inverse DRA are described as part of the bumping process. In the following, the underlined portions are those added to the bumping process described above.

In example 1, the bumping process is applied as follows; changes are shown with underlining:

The "bumping" process consists of the following ordered steps:
1. The picture that is first for output is selected as the one having the smallest value of PicOrderCntVal of all pictures in the DPB marked as "needed for output".
2. Let $s_Y[i]$, $s_{Cb}[i]$, $s_{Cr}[i]$ be the inverse DRA scales associated with the Y, Cb and Cr components, respectively, of the i-th DRA partition, and $o_Y[i]$, $o_{Cb}[i]$, $o_{Cr}[i]$ be the inverse DRA offsets associated with the Y, Cb and Cr components, respectively, of the i-th DRA partition.

For each luma sample $y_i$, the inverse DRA mapped luma sample $y_o$ is computed as follows:

$$y_o = s_Y[k] * y_i + o_Y[k],$$

where the luma sample y belongs to the k-th DRA partition.

For each Cb sample $cb_i$, the inverse DRA mapped Cb sample $cb_o$ is computed as follows:

$$cb_o = s_{Cb}[l] * cb_i + o_{Cb}[l],$$

where the luma sample corresponding to $cb_i$ belongs to the l-th DRA partition.

For each Cr sample $cr_i$, the inverse DRA mapped Cr sample $cr_o$ is computed as follows:

$$cr_o = s_{Cr}[m] * cr_i + o_{Cr}[m],$$

where the luma sample corresponding to $cr_i$ belongs to the m-th DRA partition.
3. The picture is cropped, using the conformance cropping window specified in the active SPS for the picture, the cropped picture is output, and the picture is marked as "not needed for output".
4. When the picture storage buffer that included the picture that was cropped and output contains a picture marked as "unused for reference", the picture storage buffer is emptied.

NOTE—For any two pictures picA and picB that belong to the same CVS and are output by the "bumping process", when picA is output earlier than picB, the value of PicOrderCntVal of picA is less than the value of PicOrderCntVal of picB.

Step 2 in the above bumping process is one method of implementing the inverse DRA process. It is to be understood that the methods disclosed in this disclosure may be applicable to inverse DRA process in general, including other implementations.

In example 1, $s_Y$ (e.g., luma scaling factor), $s_{Cb}$ (e.g., first chroma scaling factor), and $s_{Cr}$ (e.g., second chroma scaling factor) and $o_Y$ (e.g., luma offset), $o_{Cb}$ (e.g., first chroma offset), and $o_{Cr}$ (e.g., second chroma offset) are examples of DRA parameters that video decoder 300 determines based on information signaled by video encoder 200 (e.g., based on the DRA parameters that were used to perform the DRA at the encoder side) or based on implicit techniques. To apply the inverse DRA to the picture, picture bumping unit 316 may be configured to multiply a luma sample (y) by the luma scaling factor and add the luma offset to generate an inverse DRA mapped luma sample (e.g., $y_o$), multiply a chroma sample of a first type (e.g., $cb_i$) by the first chroma scaling factor and add the first chroma offset to generate an inverse DRA mapped chroma sample of the first type (e.g., $cb_o$), and multiply a chroma sample of a second type (e.g., $cr_i$) by the second chroma scaling factor and add the second chroma offset to generate an inverse DRA mapped chroma sample of the second type (e.g., $cr_o$).

In the above example, video decoder 300 first applied the inverse DRA and then performed the cropping. In some examples, video decoder 300 may first perform the cropping, and then perform the inverse DRA using example techniques described above.

In example 2, the bumping process is applied as follows; changes are shown with underlining:

The "bumping" process consists of the following ordered steps:
1. The picture that is first for output is selected as the one having the smallest value of PicOrderCntVal of all pictures in the DPB marked as "needed for output".
2. The picture is cropped, using the conformance cropping window, the cropped picture is remapped using the inverse mapping process specified in Clause X.X of Example 2 (below), the remapped picture is output, and the picture is marked as "not needed for output".
3. When the picture storage buffer that included the picture that was cropped, remapped and output contains a picture marked as "unused for reference", the picture storage buffer is emptied.

NOTE—For any two pictures picA and picB that belong to the same CVS and are output by the "bumping process", when picA is output earlier than picB, the value of PicOrderCntVal of picA is less than the value of PicOrderCntVal of picB.

Clause X.X of Example 2 describes cropping and mapping process and is as follows. Input to this process is a picture located in the DPB, i.e., the array of samples $recPicture_L$ and, when ChromaArrayType is not equal to 0, the arrays $recPicture_{Cb}$ and $recPicture_{Cr}$ conforming to conditions specified by the cropping video parameters.

Outputs of this process are the samples modifed by the applying the inverse DRA process, i.e., the array $outPicture_L$ and, when ChromaArrayType is not equal to 0, the arrays $outPicture_{Cb}$ and $outPicture_{Cr}$.

1. Let $s_Y[i]$, $s_{Cb}[i]$, $s_{Cr}[i]$ be the inverse DRA scales associated with the Y, Cb and Cr components, respectively, of the i-th DRA partition, $o_Y[i]$, $o_{Cb}[i]$, $o_{Cr}[i]$ be the inverse DRA offsets associated with the Y, Cb and Cr components, respectively, of the i-th DRA partition. Parameters of oY[i], oCb[i], oCr[i] are specifying DRA offset applied to the samples prior to the scaling.

For each luma sample $recPicture_Y$, the inverse DRA mapped luma sample $outPicture_L$ is computed as follows:

$$outPicture_L = s_Y[k] * (recPicture_Y - oY[k]) + o_Y[k],$$

where the luma sample y belongs to the k-th DRA partition.

For each Cb sample $recPicture_{Cb}$, the inverse DRA mapped Cb sample $outPicture_{Cb}$ is computed as follows:

$$outPicture_{Cb} = s_{Cb}[l] * (recPicture_{Cb} - oCb[k]) + o_{Cb}[l],$$

where the luma sample corresponding to $cb_i$ belongs to the l-th DRA partition.

For each Cr sample $recPicture_{Cr}$, the inverse DRA mapped Cr sample $outPicture_{Cr}$ is computed as follows:

$$outPicture_{Cr} = s_{Cr}[m] * (recPicture_{Cr} - oCr[k]) + o_{Cr}[m],$$

where the luma sample corresponding to $cr_i$ belongs to the m-th DRA partition.

In one alternative, the values of oY[i], oCb[i], oCr[i] may differ from the values of $o_Y$[i], $o_{Cb}$[i], $o_{Cr}$[i], respectively.

In the above example 2, the picture is first cropped and then the inverse DRA is applied. For instance, in example 2, $s_Y$ (e.g., luma scaling factor), $s_{Cb}$ (e.g., first chroma scaling factor), and $s_{Cr}$ (e.g., second chroma scaling factor), oY (e.g., first luma offset), $o_Y$ (e.g., second luma offset), oCb (e.g., first chroma offset), $o_{Cb}$ (e.g., second chroma offset), oCr (e.g., third chroma offset), and $o_{Cr}$ (e.g., fourth chroma offset) are examples of DRA parameters that video decoder 300 determines based on information signaled by video encoder 200 (e.g., based on the DRA parameters that were used to perform the DRA at the encoder side). The following include non-limiting examples of additional DRA parameters that video encoder 200 may signal to video decoder 300: number of ranges/partitions (partitions into which luma sample value ranges are split), end points of the partitions, number of bits used to represent fractional part and integer part of the scale values, number of bits used to represent fractional part and integer part of the offset values, equal ranges flag, which indicates that many partitions may share the same scale values, chroma scale values, and chroma offset values, which may be signaled but could be inferred in some examples.

To apply the inverse DRA to the picture, picture bumping unit 316 may be configured to subtract a first luma offset from a luma sample to generate an initial luma offset value (e.g., (recPicture$_Y$–oY[k] is the initial luma offset value)). Picture bumping unit 316 may multiply the initial luma offset value by a luma scaling factor (e.g., $s_Y$) and add a second luma offset (e.g., $o_Y$) to generate an inverse DRA mapped luma sample.

Picture bumping unit 316 may be configured to subtract a first chroma offset from a chroma sample of a first type to generate an initial chroma offset value of the first type (e.g., recPicture$_{Cb}$–oCb[k] is the initial chroma offset value of the first type). Picture bumping unit 316 may multiplying the initial chroma offset value of the first type by a first chroma scaling factor (e.g., $s_{Cb}$) and add a second chroma offset (e.g., $o_{Cb}$) to generate an inverse DRA mapped chroma sample of the first type.

Picture bumping unit 316 may be configured to subtract a third chroma offset from a chroma sample of a second type to generate an initial chroma offset value of the second type (e.g., recPicture$_{Cr}$–oCr[k] is the initial chroma offset value of the second type). Picture bumping unit 316 may multiply the initial chroma offset value of the second type by a second chroma scaling factor (e.g., $s_{Cr}$) and add a fourth chroma offset (e.g., $o_{Cr}$) to generate an inverse DRA mapped chroma sample of the second type.

In the example described above, video decoder 300 performed cropping first and then applied inverse DRA. In examples where video decoder 300 first performs inverse DRA, video decoder 300 may perform example techniques similar to those described above but prior to cropping. Video decoder 300 may then perform cropping.

In example 2.1, the inverse DRA operations may be applied using lookup tables instead of scales and offsets. In some examples, the DRA parameters include signaling parameters that may be used to derive a lookup table to map the samples from a mapped domain (e.g., DRA domain) to the original domain. In cases as in example 1, to apply the inverse DRA to the picture, picture bumping unit 316 may be configured, for a luma sample in the picture, obtained a first luma sample using the lookup table and using the first luma sample as the corresponding luma sample in the original domain, for a chroma sample of first type, obtain a first chroma sample using the lookup table and using the first chroma sample as the corresponding chroma sample in the original domain, for a chroma sample of second type, obtain a second chroma sample using the lookup table and using the second chroma sample as the corresponding chroma sample in the original domain. In other cases, a lookup table may be used to obtain the scale values to apply to the sample values.

In example 3, the bumping process is applied as follows; changes are shown with underlining:

The "bumping" process consists of the following ordered steps:
1. The picture that is first for output is selected as the one having the smallest value of PicOrderCntVal of all pictures in the DPB marked as "needed for output".
2. The picture is cropped, using the conformance cropping window, the cropped picture is remapped using the inverse mapping process specified in Clause X.X of Example 3 (below), the remapped picture is output, and the picture is marked as "not needed for output".
3. When the picture storage buffer that included the picture that was cropped and output contains a picture marked as "unused for reference", the picture storage buffer is emptied.
   NOTE—For any two pictures picA and picB that belong to the same CVS and are output by the "bumping process", when picA is output earlier than picB, the value of PicOrderCntVal of picA is less than the value of PicOrderCntVal of picB.

Clause X.X of Example 3 describes a cropping and mapping process and is as follows. Input to this process is a picture located in the DPB, i.e., the array of samples recPicture$_L$ and, when ChromaArrayType is not equal to 0, the arrays recPicture$_{Cb}$ and recPicture$_{Cr}$ conforming to conditions specified by the cropping video parameters.

Outputs of this process are the samples modifed by the applying the inverse DRA process, i.e., the array outPicture$_L$ and, when ChromaArrayType is not equal to 0, the arrays outPicture$_{Cb}$ and outPicture$_{Cr}$.

Let $s_Y$[i][x,y], $s_{Cb}$[i][x,y], $s_{Cr}$[i] [x,y] be the inverse DRA scales associated with the Y, Cb and Cr components, respectively, of the i-th DRA partition, $o_Y$[i] [x,y], $o_{Cb}$[i] [x,y], $o_{Cr}$[i] [x,y] be the inverse DRA offsets associated with the Y, Cb and Cr components, respectively, of the i-th DRA partition. Parameters of oY[i] [x,y], oCb[i] [x,y], oCr[i] [x,y] are specifying DRA offset applied to the samples prior to the scaling. [x,y] are horizontal and vertical coordinates of the sample calculated as offset from top-left (0,0) coordinate of the sample in current picture.

For each luma sample recPicture$_Y$[x,y] the inverse DRA mapped luma sample outPicture$_L$ [x,y] is computed as follows:

$$\text{outPicture}_L[x,y] = s_Y[k][x,y] * (\text{recPicture}_Y[x,y] - oY[k][x,y]) + o_Y[k][x,y],$$

where the luma sample y belongs to the k-th DRA partition.

For each Cb sample recPicture$_{cb}$, the inverse DRA mapped Cb sample outPicture$_{cb}$ is computed accordingly, taking into consideration ChromaArrayType of the coded picture.

Example 3 is similar to example 2. However, in example 3, the scaling and offset parameters may be different for different samples or may be different for different blocks or regions (e.g., where a region includes one or more blocks). For example, video decoder 300 may be configured to apply the inverse DRA for a first block of the picture based on a first set of DRA parameters for the first block and apply the inverse DRA for a second block of the picture based on a second set of DRA parameters (e.g., may have different offsets and/or scaling factors for the two blocks).

In the above examples, video decoder 300 may perform the inverse DRA sequentially with performing the cropping (e.g., applying the conformance cropping window before applying inverse DRA or after applying inverse DRA). In some examples, applying the conformance cropping window before applying the inverse DRA may be beneficial because there are fewer samples on which to apply the inverse DRA.

However, the DRA parameters may be defined based on the entire picture before cropping and therefore adjustments to the DRA parameters may be needed to account for the cropping. For example, the DRA parameters may be defined for two blocks, B1 and B2, where the blocks may be defined based on the offset values of the boundaries of the blocks from the picture boundaries. The offset values may also be signaled as part of DRA parameters.

Consider a picture of size 500×250 units of luma samples that is cropped to a picture of size 480×250 samples by cropping 10 sample columns in the left and right of the picture and 5 sample rows in the top and bottom. Let B1 and B2 be defined by offsets of the top, bottom, left and right boundaries of the blocks from the corresponding boundaries of the picture as follows: 100, 50, 100 and 300, respectively, for B1 and 150,0, 300 and 100, respectively, for B2. In this example, B1 is a block of size 100×100 with the top-left position at (100,100) and B2 is a block of size 100×100 with the top-left position at (150,300). If the inverse DRA is applied after the cropping, the parameters would be applied on a different window of samples than those signaled. For the cropped picture, block B1 would now have offsets 95, 45, 90 and 290, respectively, and block B2 would have offsets 145, 0, 290, 90.

In this example, the height of the block B2 is no longer 100 as part of the block B2 was cropped out. For decoders that may not have the ability to apply such modifications to the DRA parameters, it may beneficial to apply the cropping window after the inverse DRA operations.

Figure 12:
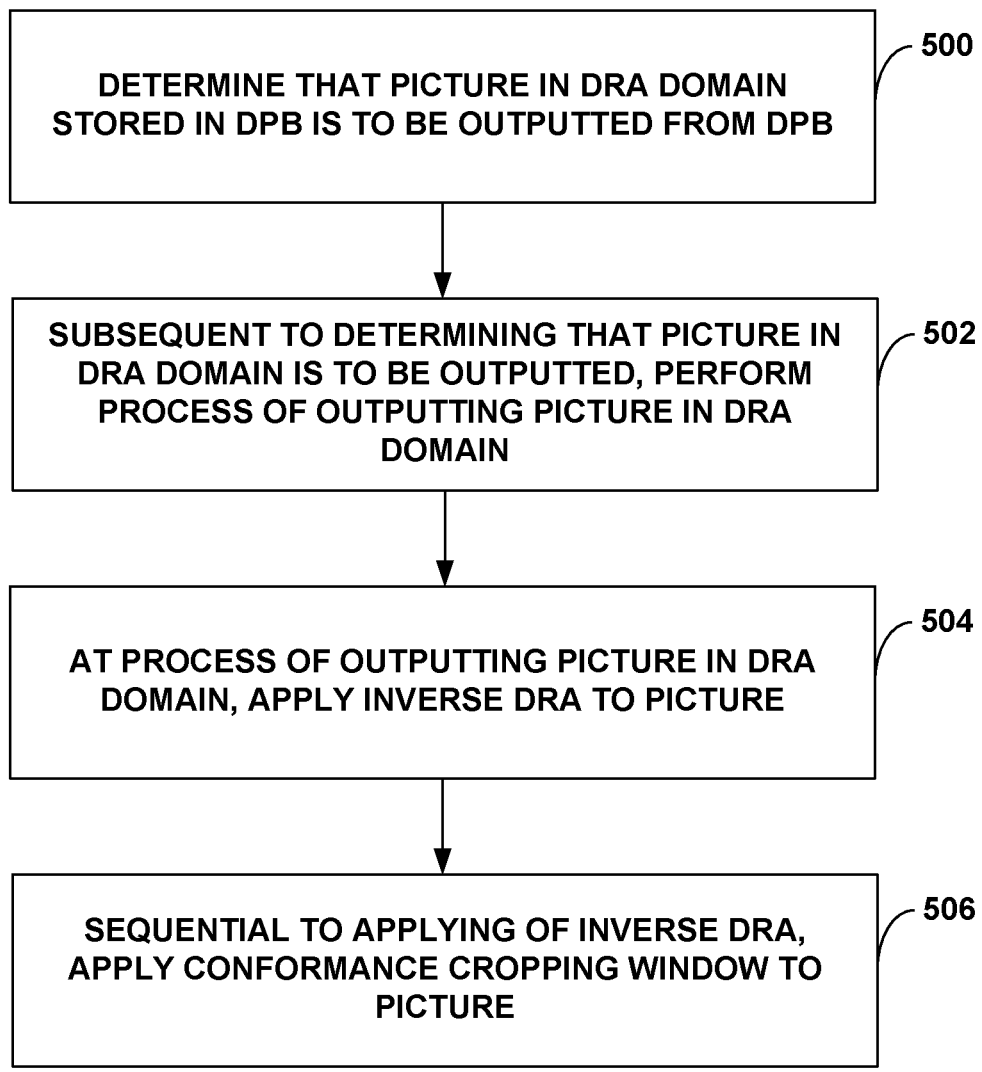
FIG. 12 is a flowchart illustrating an example method of decoding video data.

FIG. 12 is a flowchart illustrating an example method of decoding video data. For ease of illustration, the example techniques are described as part of decoding video data with video decoder 300. In some examples, video encoder 200 (e.g., via picture bumping unit 220) may be configured to perform similar operations.

Video decoder 300 may be configured to determine that a picture in a dynamic range adjustment (DRA) domain stored in DPB 314 is to be output from DPB 314 (500). For example, video decoder 300 may determine that DPB 314 is full and that a picture is to be removed so that there is space to store a next picture. As described above, the pictures in DPB 314 are decoded pictures and used as reference pictures (e.g., for inter prediction) prior to be output from DPB 314. In some instances, a video decoder may determine that the picture stored in the DRA domain in DPB 314 is to be output at a particular DpbOutputTime[ ] (e.g., timing parameter), where the picture is expected to be output as described by the bitstream conformance parameters.

Subsequent to determining that the picture in the DRA domain is to be output, video decoder 300 may perform a process of outputting the picture in the DRA domain (502). For example, picture bumping unit 316 may be configured to perform the bumping process or picture output based on a timing parameter. As described above, in one non-limiting example, as part to the bumping process, the picture that is to be output is the one having the smallest value of PicOrderCntVal (POC value) of all the picture in DPB 314 that is marked as "needed for output." Picture bumping unit 316 may determine that the picture that is marked as needed for output and has the smallest POC value is the picture that is to be output and may perform the bumping process to output the picture. In some example, picture bumping unit 316 may determine when a picture is to be output based on the timing parameter and output the picture based on the timing parameter.

At the process of outputting the picture in the DRA domain from DPB 314, video decoder 300 may apply inverse DRA to the picture (504). There may be various ways in which video decoder 300 may apply inverse DRA to the picture. As one example, picture bumping unit 316 may multiply a luma sample by a luma scaling factor and add a luma offset to generate an inverse DRA mapped luma sample and repeat these operations for the luma samples in the picture. Picture bumping unit 316 may multiply a chroma sample of a first type by a first chroma scaling factor and add a first chroma offset to generate an inverse DRA mapped chroma sample of the first type and repeat these operations for the chroma samples of the first type in the picture. Picture bumping unit 316 may multiply a chroma sample of a second type by a second chroma scaling factor and add a second chroma offset to generate an inverse DRA mapped chroma sample of the second type and repeat these operations for the chroma samples of the second picture in the picture.

As another example, to apply inverse DRA to the picture, picture bumping unit 316 may subtract a first luma offset from a luma sample to generate an initial luma offset value, multiply the initial luma offset value by a luma scaling factor and add a second luma offset to generate an inverse DRA mapped luma sample, and repeat these operations for the luma samples in the picture. Picture bumping unit 316 may subtract a first chroma offset from a chroma sample of a first type to generate an initial chroma offset value of the first type, multiply the initial chroma offset value of the first type by a first chroma scaling factor and add a second chroma offset to generate an inverse DRA mapped chroma sample of the first type, and repeat these operations for the chroma samples of the first type in the picture. Picture bumping unit 316 may subtract a third chroma offset from a chroma sample of a second type to generate an initial chroma offset value of the second type, multiply the initial chroma offset value of the second type by a second chroma scaling factor and add a fourth chroma offset to generate an inverse DRA mapped chroma sample of the second type, and repeat these operations for the chroma samples of the second type.

In some examples, video decoder 300 may determine DRA parameters for blocks of the picture. A first set of the DRA parameters are for a first block of the picture and a second set of the DRA parameters are for a second block of the picture. Values of one or more of the first set of DRA parameters may be different than values of one or more of the second set of DRA parameters. In such examples, to apply the inverse DRA, video decoder 300 (e.g., via picture bumping unit 316) may apply the inverse DRA for the first block based on the first set of DRA parameters for the first block and apply the inverse DRA for the second block based on the second set of DRA parameters for the second block.

In some examples, and not necessarily all examples, sequential to applying the inverse DRA, video decoder 300 may be configured to apply a conformance cropping window to the picture (506). As one example, sequential to applying the inverse DRA, picture bumping unit 316 may apply the conformance cropping window prior to applying the inverse DRA. Picture bumping unit 316 may apply inverse DRA to the output from the conformance cropping window. As one example, sequential to applying the inverse DRA, picture bumping unit 316 may apply the conformance cropping window subsequent to applying the inverse DRA. Picture bumping unit 316 may apply inverse DRA and output from DPB 314 and perform the conformance cropping window.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a picture in a dynamic range adjustment (DRA) domain stored in a memory is to be output from the memory, wherein the picture in the DRA domain is useable as a reference picture, and wherein the memory is configured to store pictures that are usable as reference pictures;
   subsequent to determining that the picture in the DRA domain is to be output, performing a process of outputting the picture in the DRA domain from the memory that stores the pictures that are usable as reference pictures;
   at the process of outputting the picture in the DRA domain from the memory that stores the pictures that are useable as reference pictures, applying, with a video decoder, inverse DRA to the picture to at least one of perform color conversion or increase dynamic range;
   sequential to the applying of the inverse DRA, applying a conformance cropping window to the picture; and
   outputting, with the video decoder, the picture to a video post processor after applying the conformance cropping window and the inverse DRA.

2. The method of claim 1, wherein, sequential to applying the inverse DRA, applying the conformance cropping window comprises applying the conformance cropping window prior to applying the inverse DRA, and wherein applying inverse DRA comprises applying inverse DRA to the output from the conformance cropping window.

3. The method of claim 1, wherein, sequential to applying the inverse DRA, applying the conformance cropping window comprises applying the conformance cropping window subsequent to applying the inverse DRA, and wherein applying inverse DRA comprises applying inverse DRA and outputting for performing the conformance cropping window.

4. The method of claim 1, further comprising determining DRA parameters for blocks of the picture, wherein a first set of the DRA parameters are for a first block of the picture and a second set of the DRA parameters are for a second block of the picture, wherein values of one or more of the first set of DRA parameters are different than values of one or more of the second set of DRA parameters, wherein applying the inverse DRA comprises:
 applying the inverse DRA for the first block based on the first set of DRA parameters for the first block; and
 applying the inverse DRA for the second block based on the second set of DRA parameters for the second block.

5. The method of claim 1, wherein the picture stored in the memory is a picture that was decoded and used as the reference picture prior to being output from the memory.

6. The method of claim 1, wherein, at the process of outputting the picture in the DRA domain, applying inverse DRA to the picture comprises:
 multiplying a luma sample by a luma scaling factor and adding a luma offset to generate an inverse DRA mapped luma sample;
 multiplying a chroma sample of a first type by a first chroma scaling factor and adding a first chroma offset to generate an inverse DRA mapped chroma sample of the first type; and
 multiplying a chroma sample of a second type by a second chroma scaling factor and adding a second chroma offset to generate an inverse DRA mapped chroma sample of the second type.

7. The method of claim 1, wherein, at the process of outputting the picture in the DRA domain, applying inverse DRA to the picture comprises:
 subtracting a first luma offset from a luma sample to generate an initial luma offset value;
 multiplying the initial luma offset value by a luma scaling factor and adding a second luma offset to generate an inverse DRA mapped luma sample;
 subtracting a first chroma offset from a chroma sample of a first type to generate an initial chroma offset value of the first type;
 multiplying the initial chroma offset value of the first type by a first chroma scaling factor and adding a second chroma offset to generate an inverse DRA mapped chroma sample of the first type;
 subtracting a third chroma offset from a chroma sample of a second type to generate an initial chroma offset value of the second type; and
 multiplying the initial chroma offset value of the second type by a second chroma scaling factor and adding a fourth chroma offset to generate an inverse DRA mapped chroma sample of the second type.

8. The method of claim 1, wherein determining that the picture in the DRA domain stored in the memory is to be output from the memory comprises at least one of:
 determining that a bumping process is to be applied for outputting the picture in the DRA domain from the memory; or
 determining based on a timing parameter that the picture in the DRA domain is to be output from the memory.

9. A device for decoding video data, the device comprising: and
 a memory configured to store pictures that are usable as reference pictures including a picture in a dynamic range adjustment (DRA) domain;
 a processor of a video decoder configured to:
  determine that the picture in the dynamic range adjustment (DRA) domain stored in the memory is to be output from the memory that stores the pictures that are usable as reference pictures, wherein the picture in the DRA domain is useable as a reference picture;
  subsequent to determining that the picture in the DRA domain is to be output, perform a process of outputting the picture in the DRA domain from the memory that stores the pictures that are usable as reference pictures;
  at the process of outputting the picture in the DRA domain from the memory that stores the pictures that are usable as reference pictures, apply inverse DRA to the picture to at least one of perform color conversion or increase dynamic range;
  sequential to the applying of the inverse DRA, apply a conformance cropping window to the picture; and
  output the picture to a video post processor after applying the conformance cropping window and the inverse DRA.

10. The device of claim 9, wherein the video decoder comprises at least one of fixed-function or programmable circuitry, and wherein the memory comprises a decoded picture buffer (DPB) of the video decoder.

11. The device of claim 9, wherein, sequential to applying the inverse DRA, to apply the conformance cropping window, the processor is configured to apply the conformance cropping window prior to applying the inverse DRA, and wherein to apply inverse DRA, the processor is configured to apply inverse DRA to the output from the conformance cropping window.

12. The device of claim 9, wherein, sequential to applying the inverse DRA, to apply the conformance cropping window, the processor is configured to apply the conformance cropping window subsequent to applying the inverse DRA, and wherein to apply inverse DRA, the processor is configured to apply inverse DRA and output for performing the conformance cropping window.

13. The device of claim 9, wherein the processor is configured to determine DRA parameters for blocks of the picture, wherein a first set of the DRA parameters are for a first block of the picture and a second set of the DRA parameters are for a second block of the picture, wherein values of one or more of the first set of DRA parameters are different than values of one or more of the second set of DRA parameters, wherein to apply the inverse DRA, the processor is configured to:
 apply the inverse DRA for the first block based on the first set of DRA parameters for the first block; and
 apply the inverse DRA for the second block based on the second set of DRA parameters for the second block.

14. The device of claim 9, wherein the picture stored in the memory is a picture that was decoded and used as the reference picture prior to being output from the memory.

15. The device of claim 9, wherein, at the process of outputting the picture in the DRA domain, to apply inverse DRA to the picture, the processor is configured to:
 multiply a luma sample by a luma scaling factor and add a luma offset to generate an inverse DRA mapped luma sample;
 multiply a chroma sample of a first type by a first chroma scaling factor and add a first chroma offset to generate an inverse DRA mapped chroma sample of the first type; and
 multiply a chroma sample of a second type by a second chroma scaling factor and add a second chroma offset to generate an inverse DRA mapped chroma sample of the second type.

16. The device of claim 9, wherein, at the process of outputting the picture in the DRA domain, to apply inverse DRA to the picture, the processor is configured to:
 subtract a first luma offset from a luma sample to generate an initial luma offset value;

multiply the initial luma offset value by a luma scaling factor and add a second luma offset to generate an inverse DRA mapped luma sample;

subtract a first chroma offset from a chroma sample of a first type to generate an initial chroma offset value of the first type;

multiply the initial chroma offset value of the first type by a first chroma scaling factor and add a second chroma offset to generate an inverse DRA mapped chroma sample of the first type;

subtract a third chroma offset from a chroma sample of a second type to generate an initial chroma offset value of the second type; and multiply the initial chroma offset value of the second type by a second chroma scaling factor and add a fourth chroma offset to generate an inverse DRA mapped chroma sample of the second type.

17. The device of claim 9, further comprising a display configured to display video data output with the video postprocessor.

18. The device of claim 9, wherein the device comprises one or more of a camera, a computer, a mobile device, a broadcast receiver device, or a set-top box.

19. The device of claim 9, wherein to determine that the picture in the DRA domain stored in the memory is to be output from the memory, the processor is configured to at least one of:

determine that a bumping process is to be applied for outputting the picture in the DRA domain from the memory; or determine based on a timing parameter that the picture in the DRA domain is to be output from the memory.

20. A non-transitory computer-readable storage medium storing instructions thereon that when executed cause one or more processors of a video decoder of a device for decoding video data to:

determine that a picture in a dynamic range adjustment (DRA) domain stored in a memory is to be output from the memory, wherein the picture in the DRA domain is usable as a reference picture, and wherein the memory is configured to store pictures that are usable as reference pictures;

subsequent to determining that the picture in the DRA domain is to be output, perform a process of outputting the picture in the DRA domain from the memory that stores the pictures that are usable as reference pictures;

at the process of outputting the picture in the DRA domain from the memory that stores the pictures that are usable as reference pictures, apply inverse DRA to the picture to at least one of perform color conversion or increase dynamic range;

sequential to the applying of the inverse DRA, apply a conformance cropping window to the picture; and output the picture to a video post processor after applying the conformance cropping window and the inverse DRA.

21. The non-transitory computer-readable storage medium of claim 20, wherein, sequential to applying the inverse DRA, the instructions that cause the one or more processors to apply the conformance cropping window comprise instructions that cause the one or more processors to apply the conformance cropping window prior to applying the inverse DRA, and wherein the instructions that cause the one or more processors to apply inverse DRA comprise instructions that cause the one or more processors to apply inverse DRA to the output from the conformance cropping window.

22. The non-transitory computer-readable storage medium of claim 20, wherein, sequential to applying the inverse DRA, the instructions that cause the one or more processors to apply the conformance cropping window comprise instructions that cause the one or more processors to apply the conformance cropping window subsequent to applying the inverse DRA, and wherein the instructions that cause the one or more processors to apply inverse DRA comprise instructions that cause the one or more processors to apply inverse DRA and outputting for performing the conformance cropping window.

* * * * *